United States Patent
Choi

(10) Patent No.: US 12,429,172 B2
(45) Date of Patent: Sep. 30, 2025

(54) LNG COLD ENERGY RECOVERY BY USING ICE SLURRY

(71) Applicant: Peter B. Choi, St. Davids, PA (US)

(72) Inventor: Peter B. Choi, St. Davids, PA (US)

( * ) Notice: Subject to any disclaimer, the term of this patent is extended or adjusted under 35 U.S.C. 154(b) by 0 days.

(21) Appl. No.: 18/871,785

(22) PCT Filed: Feb. 16, 2024

(86) PCT No.: PCT/US2024/016149
§ 371 (c)(1),
(2) Date: Dec. 4, 2024

(87) PCT Pub. No.: WO2024/182141
PCT Pub. Date: Sep. 6, 2024

(65) Prior Publication Data
US 2025/0172250 A1    May 29, 2025

Related U.S. Application Data

(60) Provisional application No. 63/448,359, filed on Feb. 27, 2023.

(51) Int. Cl.
| | |
|---|---|
| *F17C 9/04* | (2006.01) |
| *C09K 5/04* | (2006.01) |
| *F25C 1/00* | (2006.01) |

(52) U.S. Cl.
CPC ............... *F17C 9/04* (2013.01); *C09K 5/048* (2013.01); *F25C 1/00* (2013.01);
(Continued)

(58) Field of Classification Search
CPC ........ F17C 9/02; F25C 1/00; F25C 2301/002; C09K 5/10
See application file for complete search history.

(56) References Cited

U.S. PATENT DOCUMENTS

| | | |
|---|---|---|
| 3,232,069 A | 2/1966 | Hawkins |
| 3,869,870 A | 3/1975 | Kuehner |
| | (Continued) | |

FOREIGN PATENT DOCUMENTS

| | | | |
|---|---|---|---|
| JP | 297845 A | | 4/1990 |
| KR | 20090105096 A | * | 10/2009 |
| | (Continued) | | |

OTHER PUBLICATIONS

Machine Translation of 20090105096 (Year: 2009).*
(Continued)

*Primary Examiner* — Filip Zec
(74) *Attorney, Agent, or Firm* — John H. Choi & Associates

(57) ABSTRACT

LNG cold energy can be recovered from the regasification process by using ice slurry. Ice slurry is used as a cold energy storage medium and heat transfer fluid. Currently, LNG at −162° C. is vaporized to city gas in heat exchange with sea water and the chilled sea water is disposed of into the sea. The cold energy recovered in a form of ice slurry at temperature of −45° C. is used for freeze and refrigeration warehouses, cooling data centers and HVAC of commercial buildings, cold energy industries, and $CO_2$ liquefaction for CCUS. Ice slurry is produced in large capacities required for the LNG regasification process by direct contact heat transfer in the water layer with cold light solvent bubbles which are generated by the distributor nozzles being submerged in the heavy solvent layer. Toluene is used as the light solvent liquid and perfluorohexane or perfluoroheptane as the heavy solvent.

20 Claims, 8 Drawing Sheets

(52) U.S. Cl.
CPC .............................. *F17C 2221/033* (2013.01);
*F17C 2227/0365* (2013.01); *F25C 2301/002*
(2013.01)

(56) References Cited

U.S. PATENT DOCUMENTS

| | | | | |
|---|---|---|---|---|
| 5,598,712 | A | 2/1997 | Kramer | |
| 6,082,118 | A * | 7/2000 | Endrizzi | F17C 11/007 62/46.1 |
| 6,793,007 | B1 * | 9/2004 | Kramer | H01L 23/4735 165/80.4 |
| 8,304,566 | B2 * | 11/2012 | Cantizani | C11C 3/003 554/170 |
| 8,678,514 | B2 * | 3/2014 | Efthymiou | E02F 3/8866 299/8 |
| 8,901,330 | B2 * | 12/2014 | Doyle | C07C 67/48 554/169 |
| 9,738,842 | B2 * | 8/2017 | Scott | C10G 33/00 |
| 9,951,496 | B2 * | 4/2018 | Vaughan | E02F 3/8866 |
| 10,054,372 | B2 * | 8/2018 | Vendeirinho | F24D 11/006 |
| 10,234,186 | B1 * | 3/2019 | Koh | F25C 1/00 |
| 10,254,012 | B2 * | 4/2019 | Choi | F03G 6/111 |
| 10,989,458 | B2 * | 4/2021 | Hirokane | F25D 3/02 |
| 11,060,781 | B2 * | 7/2021 | Hemrle | F28F 13/04 |
| 11,927,391 | B2 * | 3/2024 | Kaminsky | F25J 1/0032 |
| 12,000,659 | B2 * | 6/2024 | Ishmael | C09K 5/063 |
| 2005/0039883 | A1 | 2/2005 | Kramer | |
| 2005/0172659 | A1 | 8/2005 | Barker | |
| 2007/0196250 | A1 * | 8/2007 | Leveson | B01D 17/0208 422/187 |
| 2009/0211263 | A1 | 8/2009 | Coyle | |
| 2010/0175689 | A1 | 7/2010 | Zillmer | |
| 2010/0199669 | A1 | 8/2010 | Gathmann | |
| 2011/0017196 | A1 | 1/2011 | Bell | |
| 2013/0255254 | A1 | 10/2013 | Ehrsam | |
| 2014/0000583 | A1 | 1/2014 | Kotze | |
| 2014/0196474 | A1 * | 7/2014 | Yoo | F25J 1/0025 62/48.1 |
| 2015/0096299 | A1 | 4/2015 | Sakadjian | |
| 2015/0128931 | A1 | 5/2015 | Joshi | |
| 2016/0273819 | A1 | 9/2016 | Choi | |
| 2020/0198750 | A1 * | 6/2020 | Laird | F25D 17/02 |

FOREIGN PATENT DOCUMENTS

| | | |
|---|---|---|
| WO | 2012104787 A1 | 8/2012 |
| WO | 2014012039 A1 | 1/2014 |
| WO | 2022203600 A1 | 9/2022 |

OTHER PUBLICATIONS

ISA/US, International Search Report and Written Opinion, PCT/US24/16149, May 31, 2024.

Atienza-Marquez A. et al., "Regasification of liquefied natural gas in satellite terminals: Techno-economic potential of cold recovery for boosting the efficiency of refrigerated facilities," Energy Conversion and Management, 2021, vol. 248, article No. 114783, 15 pp.

Qianli Chu, Marvin S. Yu, and Dennis P. Curran, "New Fluorous/Organic Biphasic Systems Achieved by Solvent Tuning," National Institute of Health, Tetrahedron 63(39), 9890-9895, Sep. 24, 2007, Relevant pages: p. 12 (Table 3); p. 13 (Table 4).

James A. Heist, Frrezing Crystallization, Chemical Engineering, 72-82, May 7, 1979: Relevant pages; p. 78 (Figure 3—Installed Capital Cost, $100,000's vs. Freezer Duty, Thousand Btu/h).

S.A. Kulinich, S. Farhadi, K. Nose, and X.W. Du, Superhydrophobic Surfaces: Are They Really Ice-Repellent?, Langmuir, 27(1), 25-29, 2011: Relevant pages; p. 25; p. 29 (Conclusions).

A.J.B. Milne and A. Amirafazli, Drop Shedding by Shear Flow for Hydrophilic to Superhydrophobic Surfaces, Langmuir, 25(24), 14155-14165, 2009: Relevant pages; p. 14161 (Figure 5).

Robert H. Perry and Don W. Green, Perry's Chemical Engineers' Handbook, Seventh Edition, McGraw-Hill, 1999: Relevant pages; p. 6-50 to p. 6-52 (Particle Dynamics).

Paul Rivet, IIR Review Article: Ice Slurries—State of the Art, Ecolibrium, 28-33, Jul. 2008: Relevant pages; p. 31.

Charles C. Ryerson, Icing Management for Coast Guard Assets, Cold Regions Research and Engineering Laboratory, Engineer Research and Development Center, U.S. Army Corps of Engineers, Apr. 2013: Relevant pages; p. 192 (5-3—Coatings and Surface Treatments); p. 204 (Figure 5-11); p. 211 (Table 5-2—Coating Sources).

Srinivas Bengaluru Subramanyam, Konrad Rykaczewski, and Kripa K. Varanasi, Ice Adhesion on Lubricant-Impregnated Textured Surfaces, Langmuir, 29, 13414-13418, 2013: Relevant pages; p. 13414; p. 13417.

3M Corporation, Product Information, Physical Properties of FC-72, of which the chemical formula is C6F14, issued May 2000.

3M Corporation, Product Information, Physical Properties of FC-84, of which the chemical formula is C7F16, issued May 2000.

3M Corporation, Solubility, In p. 63, Table 14, Solubility of FC-72 and FC-84 in Toluene is slightly soluble (1-5 g/100g), respectively. In p. 64, Table 15, Solubility of Toluene in FC-72 and FC-84 is slightly soluble (1-5 g/100g), respectively.

3M Specialty Fluids Newsletter, vol. 1, No. 1, Apr. 1995, in Table 4-1, Properties of Fluorocarbon, col. #5 and #6, chemical formula of FC-72 and FC-84 is C6F14 and C7F16, respectively.

* cited by examiner

Freezing point of potassium formate – water

LNG COLD ENERGY RECOVERY BY USING ICE SLURRY

CROSS-REFERENCE TO RELATED APPLICATION

The present application claims priority to U.S. Provisional Application No. 63/448,359, filed on Feb. 27, 2023, titled "LNG Cold Energy Recovery by Using Ice Slurry," which is incorporated by reference in its entirety.

FIELD OF INVENTION

The present invention is related to the generation of ice slurry in direct contact heat transfer without problems from ice clogging, enabling to make the scale-up of the plant easier and the installation and operation costs lower. This technology enables to recover cold energy from LNG (Liquefied Natural Gas) by using ice slurry.

BACKGROUND OF THE INVENTION

The embodiment system of this invention generates ice slurry in direct contact heat transfer using two immiscible solvents one heavier than water and the other lighter than ice. The system comprises an ice generating tank producing ice by circulating immiscible light solvent as a cold heat transfer medium and a chiller that cools the light solvent stream. As for the ice generation tank of this invention, it generates ice slurry without ice adhesion problems. As for the chiller, it cools the light solvent stream without the problems of plugging by ice adhesion. The prior art is described below with an emphasis on the previous efforts having been made in the industry to resolve the problems of ice adhesion on cold surfaces that have been experienced in the ice slurry generators and solvent chillers.

Ice has been a favorite commodity in human life throughout the history. Innumerous attempts must have been tried to produce it in controllable ways. However, it still remains difficult to resolve the major problem of ice scale formation taking place on the cold heat transfer surfaces. Ice is made in the cold freezer boxes or in the ice makers having scrapers. The scrapers remove ice scale continuously, typically at 450 RPM, from the cold surfaces before the ice accumulates to a thickness at which it is hard to detach the scale due to the high adhesion forces along with a decrease of the heat transfer rates. Even with scrapers, the temperature driving force cannot go much larger than around 5° C., because with the larger temperature differences the ice scale formation becomes too severe to control. This difficulty limits the production capacity of ice makers. In addition, the ice makers with scrapers are mostly custom designed, and the units of larger capacities must be custom designed again rather than being expanded to larger sizes using the regular engineering scale-up rules. In order to circumvent these problems, new ideas of ice generation methods have been tried.

The new ideas have utilized the heat transfer techniques such as the evaporation of water as a refrigerant in vacuum, the direct contact heat transfer with refrigerants that vaporize in the water layer, the direct contact heat transfer with the immiscible solvents cooled by chillers, the super-cooling effect of water, and the fluidized bed freezers. With some exceptions, all these methods still have difficulties for commercial uses. The method of evaporation of water as a refrigerant in vacuum, for example, is in use most successfully for HVAC systems but only at temperatures near the freezing point of water for the applications in large capacities. The direct contact heat transfer with refrigerants or immiscible solvents experiences severe clogging problems due to the adhesion of ice on the cold surfaces around the distributor of cold medium along with many others. The method of using the super-cooling effect of water is not yet fully matured being unstable in operation with difficulties in control. The fluidized bed freezers are still in the development stage with problems similar to the scraped surface ice generators in ice adhesion.

The direct contact heat transfer using immiscible solvent still has a great possibility for ice slurry generation, once the ice clogging problems around the cold solvent distributor are resolved. When a cold solvent lighter than ice in density is injected into the water layer at the bottom of the tank, ice adheres on the cold surfaces of the solvent distributor quickly, resulting in clogging of nozzles. In order to resolve this problem, a solvent liquid heavier than water was injected into the water layer from the nozzles submerged in the heavy solvent layer at the bottom. The heavy solvent droplets shot into the water layer fell back quickly into the heavy solvent layer with a limited residence time resulting in insufficient heat transfer. When the heavy solvent is sprayed above the ice layer at the top of the tank in order to avoid ice clogging, it is difficult to have a controllable liquid distribution. When the solvent is sprayed below the ice layer, ice clogging occurs quickly again due to the adhesion of ice on the cold surfaces of the solvent distributor. The clogging problems around the distributor were well explained in the patent application (US 20050172659 A1), where a divergent inlet nozzle was proposed to resolve the problems.

In order to cool the circulating immiscible solvent stream, this invention uses a chiller having the solvent side heat transfer surfaces coated with a hydrophobic coating material. The hydrophobic coating prevents adhesion on the cold surfaces of the ice particles which are produced by freezing of the water molecules undissolving from the solvent stream. The prevention of ice adhesion is possible because the solvent functions as a lubricant on the cold surfaces allowing no area and residence time for the undissolving water droplets to sit on the cold surfaces and freeze to a sessile particle. The water molecules are produced by undissolving in the immiscible light solvent due to the decreasing solubility of water in the solvent while the solvent is cooled to lower temperatures. The undissolving effect is more significant for the immiscible solvents having high solubility of water than those having low solubility. For example, the solubility of water in toluene is in a range of around a hundred ppm, while that in perfluorohexane (C6F14) less than 10 ppm, and therefore the water freezing problems are more significant with toluene than perfluorohexane. The concerns about blockage of the passages in a chiller by freezing of the water entrained in the cold solvent were explained in the patent application (US 20050172659 A1), where a new type of inlet nozzle for the cold solvent feed was suggested to prevent such entrainment. The same problems must be expected from the water undissolving in solvent as those from the water entrained.

The effectiveness of the coated surfaces with the hydrophobic coating material was tested for icephobicity with a mixture of water and a freezing point depressant or an emulsion of water and oil, and found that the water froze with ice adhering on the cold surfaces. In order to improve the performance of the coated surfaces, a lubricant was applied on the surface and found that, in the atmosphere, the treated surfaces repelled water drops much better than the un-lubricated surfaces, but eventually lost the effectiveness while the lubricant was depleted due to the outside impacts such as those from a torrential rain. The loss of effectiveness was caused by penetration of air and water molecules into the pore structure of the surface as a result of the impacts, and then eventually the air molecules were replaced with water to wet the whole area. The liquid water molecules then became sessile on the surface and could have enough time for heat transfer to freeze. The lubricated hydrophobic surface was called SLIPS (slippery liquid-infused porous surfaces) that mimics the performance of a lotus leaf, and tested for the hydrophobic and icephobic effects mainly in the atmosphere.

Another factor to consider for prevention of ice adhesion in the chiller is the residence time for the water droplets of the undissolving molecules to sit on the cold surfaces for heat transfer to freeze. According to an experiment with a water drop of 2 micro-liters (µl), the drop is carried away by an air stream at the velocities above 5 m/s from the surface coated with superhydrophobic coating material. This means that a sufficient drag force can carry away the water droplets allowing no residence time to freeze on the cold surfaces. Actually, this phenomenon of particle removal makes the application in liquid phase more effective than in air, because the liquid flow can exert the equivalent drag forces at much lower velocities due to its high density compared to the air.

At the present time, no hydrophobic coating materials exist that exhibit icephobicity in actual applications at subzero conditions. In order for the hydrophobic surfaces to show icephobicity, a unique operational environment must be provided while in use in every particular application.

In summary, the ice slurry as a cold energy storage and transfer medium has been mostly used in applications requiring capacities lower than 100 KW (28 refrigeration tons) such as small food and fishing industries. This capacity is about the limit of the mechanical design for scraped surface ice slurry generators because of the ice adhesion problems. For wider applications in industry, however, higher capacities even up to 800 KW are usually necessary. However, the cost of multiple units hampers adoption of this option. The complexities in installation and maintenance are the other issues. A new generation method of simpler design at lower installation costs will stimulate the popularity of ice slurry as a cooling medium in the industries.

BRIEF SUMMARY OF THE INVENTION

The following presents a simplified summary of some embodiments of the invention in order to provide a basic understanding of the invention. This summary is not an extensive overview of the invention. It is not intended to identify key/critical elements of the invention or to delineate the scope of the invention. Its sole purpose is to present some embodiments of the invention in a simplified form as a prelude to the more detailed description that is presented later.

The new ice slurry manufacturing process must be easy for scale-up and construct for all capacities, inexpensive to build and operate, and reliable for consistent production. This invention illustrates an ice manufacturing process operating in direct contact heat transfer with two immiscible solvents, where the light solvent circulates through a chiller and is injected back into the heavy solvent layer that stays stagnant at the bottom of the ice production tank. When the immiscible light solvent is injected into the immiscible heavy solvent layer, there is no free water to freeze and adhere to the cold surfaces of the light solvent distributor.

The chiller of this invention is also designed such that no ice blockage takes place due to the undissolution of water from the solvent. The present invention overcomes the difficulties of ice adhesion making the ice slurry manufacturing process of this invention readily utilized for the industry. The present embodiment provides many advantages which are described in detail below.

The problem of forming ice scale on cold heat transfer surfaces in the ice slurry production tank is resolved in this invention by utilizing two immiscible solvents one being heavier than the water and the other lighter than the ice. The light solvent is cooled by an outside chiller and returns back to the tank. The cold immiscible light solvent is injected into the stagnant immiscible heavy solvent layer to generate light solvent bubbles with no ice adhesion, because there are no free water molecules available in the immiscible heavy solvent layer. The light solvent bubbles rise through the water layer exchanging cold energy to produce ice, and collect above the ice slurry layer at the top of the tank. The light solvent stream is then withdrawn from the tank again, and recirculates through the chiller. The ice slurry stream of around 15 wt. % ice is withdrawn below the light solvent layer through an ice slurry downcomer.

The ice slurry downcomer separates the light solvent bubbles from the ice slurry stream. For an effective separation, the velocity of the downward ice slurry flow in the downcomer is maintained below the terminal velocity of the light solvent bubbles but at the same time above the hindered settling velocity of the ice particles with sufficient disengagement height. This velocity allows the light solvent bubbles to float by their buoyant forces from the withdrawing ice slurry stream, but the ice particles to be carried with the ice slurry flow. The disengagement height of the downcomer allows enough time for the light solvent bubbles to escape from the downward ice slurry flow. Any light solvent bubbles still being entrained in the withdrawing ice slurry flow is further separated in the subsequent ice slurry separation tank, and sent back to the ice slurry production tank.

In the ice slurry separation tank, the downward flow in the inverted cone section of the tank is maintained at the hindered settling velocity of the ice particle of wanted size so that the ice slurry flow can carry all ice particles smaller than that size as a homogeneous ice slurry product, and the larger ones float and are separated. The collected light solvent is withdrawn from the tank, and the large ice particles floating at the top of the ice slurry layer are also removed along with the light solvent while they are melted by mixing with the returning warm brine in the feed line before they are fed into the ice slurry production tank. This ice melting step prevents the large ice particles from agglomerating to larger sizes in this closed system of ice slurry manufacturing process.

In this invention, the solvent side heat transfer surfaces of the chiller are coated with a hydrophobic coating material. The light solvent stream undissolves water molecules while it is cooled in the chiller. The higher the amount of undissolving water from the solvent is, the greater is the probability for the water molecules to adhere on the cold heat exchanger surfaces and eventually to cause blockage in the chiller. This invention, therefore, provides operational environments for the hydrophobic coating to prevent the undissolving water molecules from being sessile on the cold surfaces. The prevention of ice adhesion is achieved by using the immiscible light solvent as a lubricant on the coated surfaces.

As a matter of fact, there are no hydrophobic coating materials available that can transfer their water repelling properties at room temperatures to ice repelling properties for the services under sub-zero conditions in actual applications. A typical example of this difficulty is illustrated in the patent application (WO 2014012039 A1), where an immobilized lubricant layer is formed on the hydrophobic substrate surfaces, called SLIPS (slippery liquid-infused porous surfaces), in order to achieve an improved performance for icephobicity under freezing conditions. The SLIPS have a specially designed reentrant curvature at their pore entrances in an attempt to hold the lubricant more securely. Even though the reentrant curvature at the entrances help the SLIPS maintain the effectiveness of icephobicity longer, they will eventually lose the effectiveness due to the impacts from outside sources as well as the destruction of surface structure while in use in the atmosphere. In this invention, unlike the SLIPS, the hydrophobic coated surfaces are fully exposed to the flowing stream of an immiscible solvent stream and replenished with the solvent freely in order to maintain the capability of icephobicty. Especially, the operating methods of this invention enable both hydrophobicity and icephobicity to be maintained without a time limit as long as the coated surfaces are used accordingly.

In addition, the velocity of the immiscible light solvent flow is maintained high enough so that the undissolving water molecules and the subsequent ice particles are carried away with the solvent stream by drag forces. Also, careful tube bundle design eliminates any possibility of forming stagnant spaces in the solvent side of the chiller so that no accumulation of the undissolving water and subsequent ice can occur. Such unique operating methods enable to preserve both hydrophobicity and icephobicity for the coated surfaces of the chiller in actual production operations.

Additionally, no air or gas bubbles are allowed in the solvent stream during the chilling process in order to prevent the replacement of solvent by the gaseous molecules. The gas molecules in the pore spaces are vulnerable to getting replaced by water molecules, eventually causing wet surfaces. Therefore, the design of the chilling process ensures that no air or gases is entrained into the chiller. Such specific operational environments enable to preserve hydrophobicity and icephobicity for the coated surfaces of the chiller.

The present invention provides a new option for generation of ice slurry. The ice slurry production tank can produce the product in higher capacities at low installation and maintenance costs. For example, unlike the scraped surface generators having capacity limits at around 100 KW (28 refrigeration tons) per a unit, the embodiment of this invention has a capability for much higher capacities because it comprises of unit operations that are easy to design and scale-up. Also, the simple design enables to reduce the installation cost to around one half of that of the scraped surface generators with simple maintenance requirements. Those benefits are made possible because the present invention prevents ice adhesion in the process.

The present invention provides a LNG (liquified natural gas) cold energy recovery system comprising: an LNG regasification heat exchanger, the LNG regasification heat exchanger receiving LNG at −162° C. and vaporizing the LNG to natural gas; and an ice slurry production tank having a top layer having a light solvent, a middle layer having water and a bottom layer having a heavy solvent, wherein the middle layer comprises water, ice particles and a freezing point depressant, wherein the top, middle and bottom layers are different liquids with different densities and immiscible to each other, and wherein toluene is chilled by the LNG regasification heat exchanger and fed into the bottom layer, thereby forming toluene bubbles having less density than the middle layer. The toluene bubbles are fed into the bottom layer by distributor nozzles, the bottom layer being more dense than the middle layer, thereby the middle layer prevented from reaching the distributor nozzles. The bottom heavy solvent layer is selected from a group consisting perfluorohexane ($C_6F_{14}$) and perfluoroheptane ($C_7F_{16}$). The freezing point depressant dissolves in water and is insoluble in the top light solvent and in said heavy solvent; wherein the freezing point depressant is a substance selected from a group comprising LiCl, NaCl, $K_2CO_3$, $CaCl_2$), $MgCl_2$, KAc (Potassium Acetate), and KCOOH (Potassium Formate). In the LNG regasification heat exchanger, the flow rate of the toluene changes in response to the flow rate of the LNG while the temperature of the toluene is kept constant.

In one aspect, the LNG cold energy recovery system further comprises a superheater heat exchanger, wherein the natural gas from said LNG regasification heat exchanger is heated to a temperature above +2° C. in the natural gas superheater heat exchanger; wherein the heating medium for said superheater heat exchanger is an aqueous solution of a freezing point depressant which can be cooled to a temperature below 0° C. at an exit of the superheater heat exchanger; and wherein the freezing point depressant is a substance selected from a group consisting LiCl, NaCl, ethylene glycol, propylene glycol, KAc (potassium acetate) and potassium formate (KCOOH). The superheater heat exchanger is a closed system having a natural gas side and a heating medium side, wherein for the natural gas side, stainless steel is used for construction and for the heating medium side, the material of construction is a substance selected from a group consisting stainless steel and carbon steel.

In another aspect, the LNG cold energy recovery system of the present invention further comprises an ice slurry separation tank for separating an ice slurry stream from a toluene stream from the ice slurry production tank; wherein the terminal velocity of a toluene bubble of 5 mm in diameter is Vt m/s whereas the hindered settling velocity of an ice particle of 1 mm in diameter Vs m/s; wherein, for the downward ice slurry flow at a bottom section of the ice slurry separation tank, the bulk flow velocity is maintained higher than Vs m/s but lower than Vt m/s; and wherein, for the upward toluene flow exiting through a nozzle located at the top section of the ice slurry separation tank, the nozzle is located where the level of the nozzle can prevent entrainment of blanketing nitrogen gas and the ice slurry. The ice slurry separation tank further comprises an explosion proof pump to circulate the toluene stream from a top layer of the ice slurry separation tank to the LNG regasification heat exchanger and then to the bottom layer of the ice slurry production tank.

In another aspect, the LNG cold energy recovery system further comprises an ice slurry storage tank for receiving ice slurry from the ice slurry separation tank, wherein: the ice slurry storage tank operates continuously for LNG cold energy recovery while charging and discharging ice slurry at the same time; the ice slurry storage tank is charged with ice slurry from the ice slurry separation tank; the ice slurry storage tank discharges ice slurry at least to cold energy users and a $CO_2$ liquefaction heat exchanger for CCUS (Carbon Capture, Utilization, and Storage); and the ice slurry storage tank is sized for a capacity sufficiently large enough for the continuous operation by storing the excess ice slurry and discharging it during the peak hours for the deficient amount. The $CO_2$ liquefaction heat exchanger condenses $CO_2$ gas by using the ice slurry generated with the LNG cold energy recovered; said $CO_2$ gas is fed from $CO_2$ capture processes; said ice slurry is available for $CO_2$ liquefaction from −45° C.; said $CO_2$ gas is liquefied at −30° C. and 15 bar for transport; said ice slurry is supplied at temperatures higher than −45° C. in order to condense $CO_2$ gas at higher pressures; said $CO_2$ gas is liquefied for temporary storage for CCUS (Carbon Capture, Utilization, and Storage); and said recovered LNG cold energy is used to cool the $CO_2$ gas during the compression process for CCUS.

In another aspect, the ice slurry is generated at the ice concentration up to 15% in weight; said ice slurry can be concentrated for various applications; and for the ice slurry, ice particles of 1 mm to 100 micron in diameter are used.

In another aspect, the LNG regasification heat exchanger is a closed system having an LNG side and a toluene side, wherein for the LNG side, stainless steel is used for the material of construction and for the toluene side, the material of construction is a substance selected from a group consisting stainless steel and carbon steel.

In another aspect, the natural gas superheater heat exchanger is used to heat the natural gas exiting the LNG regasification heat exchanger; a $CO_2$ stream for a CCUS heats the natural gas as a heating medium; and said $CO_2$ stream is condensed in a $CO_2$ liquefaction heat exchanger.

In other aspects, no nitrogen gas is entrained in the toluene stream fed to the LNG regasification heat exchanger; no ice slurry is entrained in the toluene stream fed to the LNG regasification heat exchanger; nitrogen blanketing is used for the ice slurry production tank to prevent leakage of the bottom layer of heavy solvent; and each of the ice slurry production tank and the ice slurry separation tank has a safety valve leading to a flare system.

BRIEF DESCRIPTION OF THE DRAWINGS

The foregoing summary, as well as the following detailed description of presently preferred embodiments, will be better understood when read in conjunction with the appended drawings. For the purpose of illustrating the embodiments, there are shown in the drawings embodiments which are presently preferred. It should be understood, however, that the embodiments are not limited to the precise arrangements and instrumentalities shown.

Figure 1:
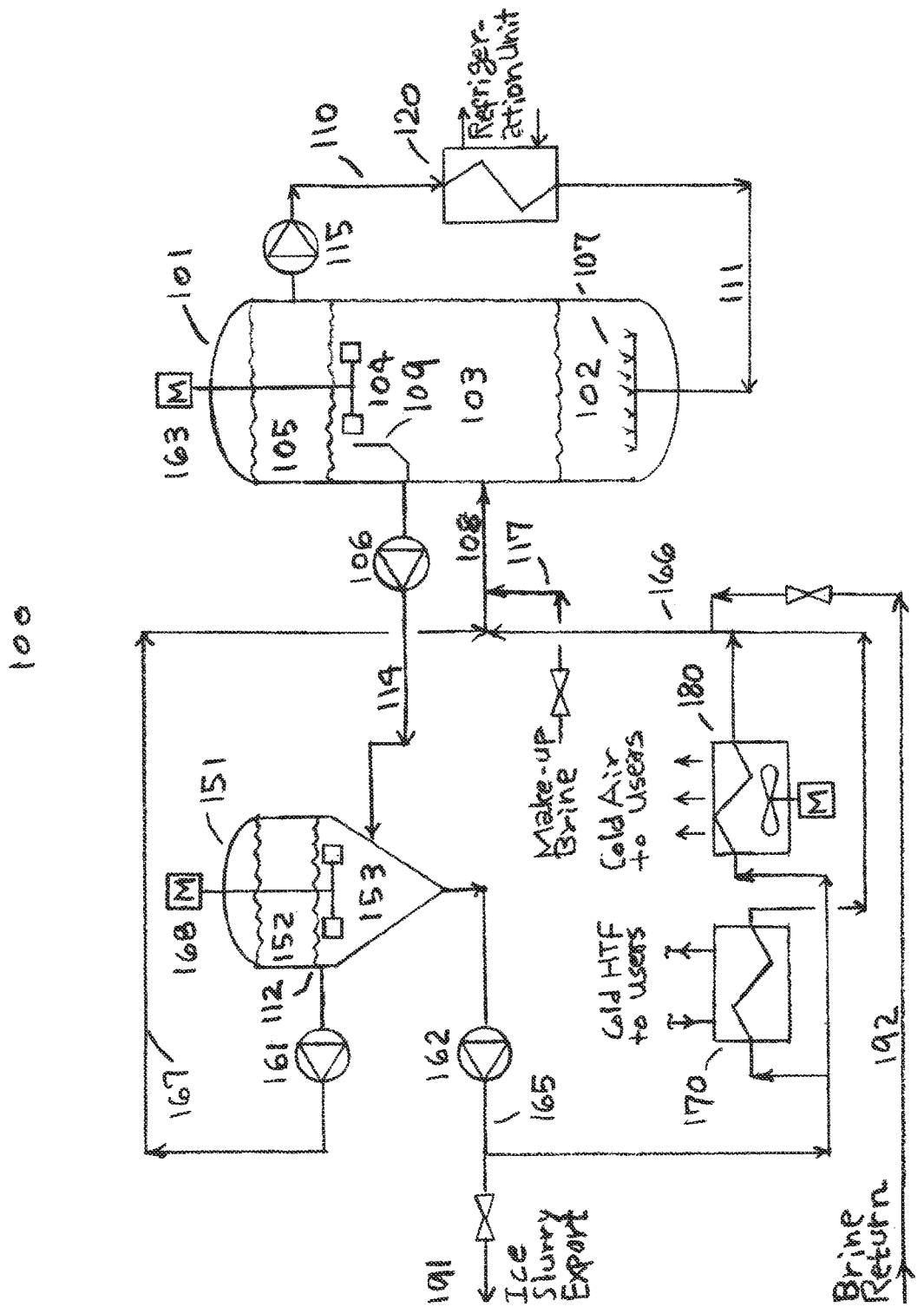
FIG. 1 is a schematic flow chart of an ice slurry manufacturing process comprising an ice production tank, an ice slurry separation tank, and a chiller.

To facilitate an understanding of the invention, identical reference numerals have been used, when appropriate, to designate the same or similar elements that are common to the figures. Further, unless stated otherwise, the features shown in the figures are not drawn to scale but are shown for illustrative purposes only.

DETAILED DESCRIPTION OF THE INVENTION

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Certain terminology is used in the following description for convenience only and is not limiting. The article "a" is intended to include one or more items, and where only one item is intended the term "one" or similar language is used. Additionally, to assist in the description of the present invention, words such as top, bottom, upper, lower, front, rear, inner, outer, right and left are used to describe the accompanying figures. The terminology includes the words above specifically mentioned, derivatives thereof, and words of similar import.

Ice slurry manufacturing process 100 of this invention in FIG. 1 generates an ice slurry stream 114 at −5° C. from a brine feed 108 at 1° C. in ice slurry production tank 101 using a chiller 120. The ice production tank 101 has two immiscible solvent layers; a layer 102 being heavier in density than water and the other layer 105 lighter than ice. The ice slurry is produced in direct contact heat transfer with the light solvent bubbles generated by distributor 107 in heavy solvent layer 102. The ice slurry product comprises of 15 wt. % ice particles in sizes ranging from around 100 microns to 1 mm, while the light solvent bubbles are in sizes from around 5 mm to 10 mm. The light solvent bubbles collect in immiscible light solvent layer 105 at the top of the ice slurry production tank. Ice slurry 114 produced in tank 101 is sent by pump 106 to ice slurry separation tank 151 through downcomer 109. The entrained light solvent bubbles are first separated in downcomer 109 and further in ice slurry separation tank 151 from the ice slurry stream by using buoyant forces.

From the ice slurry separation tank 151, stream 167 comprising of the entrained light solvent and the large ice particles is sent by pump 161 to be mixed with stream 166. The homogeneous ice slurry product stream 165 is supplied by pump 162 to the users 170 and 180. The brine stream 166 of the melted ice slurry is recycled to ice slurry production tank 101 from users 170 and 180 along with stream 167. At this time, the large ice particles in stream 167 are melted in stream 108 by mixing with warm returning stream 166.

Agitator 163 in ice slurry production tank 101 operates in low speeds to push the ice slurry toward ice slurry downcomer 109, and agitator 168 in ice slurry separation tank 151 to push large ice particles to exit nozzle 112. The ice slurry manufacturing process 100 is a completely closed system requiring very small amount of fresh make-up brine 117.

The ice slurry mixture of 15 wt. % ice is fed into the inverted circular cone section of ice slurry separation tank 151, where it flows down at a specific velocity to carry the ice particles of wanted sizes with it but to release the light solvent bubbles to rise. This inverted cone keeps the ice slurry product to be homogeneous. By being homogeneous, it means that the particles are evenly distributed in the slurry flow without any segregated layer of particles. To form a homogeneous ice slurry mixture without this inverted cone, it usually needs appreciable agitation in a tank as ice tends to float. The entrained light solvent bubbles along with the large ice particles are also separated from the ice slurry product stream in this inverted cone. The ice slurry 191 may be exported when needed, and the used brine 192 returns to the process. The exported ice slurry can be used to produce pure ice particle blocks after the brine removal and water wash steps or stored for later use for the peak shaving of power consumption.

Recirculating cold light solvent stream 111 is continuously injected by distributor 107 into the immiscible heavy solvent layer 102 to generate bubbles of immiscible light solvent without ice clogging, and the bubbles ascend by buoyant forces through water layer 103 exchanging cold energy to produce ice. Returning brine stream 108, a mixture of streams 166 and 167, is continuously fed into the water layer 103. Ice slurry stream 114 of 15 wt. % ice, a Newtonian fluid, is continuously withdrawn through ice slurry downcomer 109. Stream 110 from the layer of collected light solvent is circulated by pump 115 through chiller 120. When this cold immiscible light solvent stream 111 is injected back into immiscible heavy solvent layer 102, ice clogging does not take place because there is no free liquid water available to freeze in the stagnant immiscible heavy solvent layer.

Figure 4:
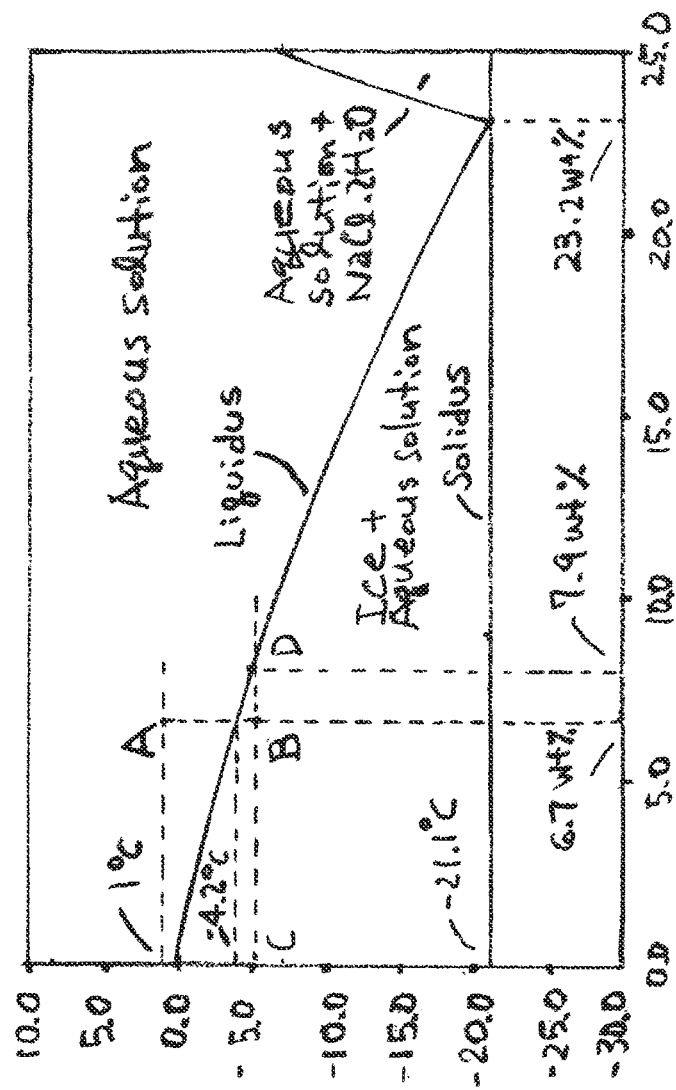
FIG. 4 is a phase diagram of a eutectic system of NaCl—$H_2O$.

The phase diagram of water-NaCl binary system in FIG. 4 shows the operating conditions for the ice slurry production process. A brine feed at point A at 6.7 wt. % NaCl and 1° C. is continuously fed into the water layer in the ice slurry production tank. The feed brine is in direct contact heat exchange with the cold immiscible light solvent bubbles generated at −15° C. The feed is then cooled to −5° C. as shown at point B in the figure, where pure ice crystals are produced. It separates into point C of pure ice and point D of 7.9 wt. % brine. As a result, 15 wt. % of the feed brine is crystallized into pure ice and 85 wt. % of the feed remains as a brine solution of 7.9 wt. % NaCl. The pure ice produced is withdrawn in ice slurry stream 114 that contains 15 wt. % of ice.

Figure 2:
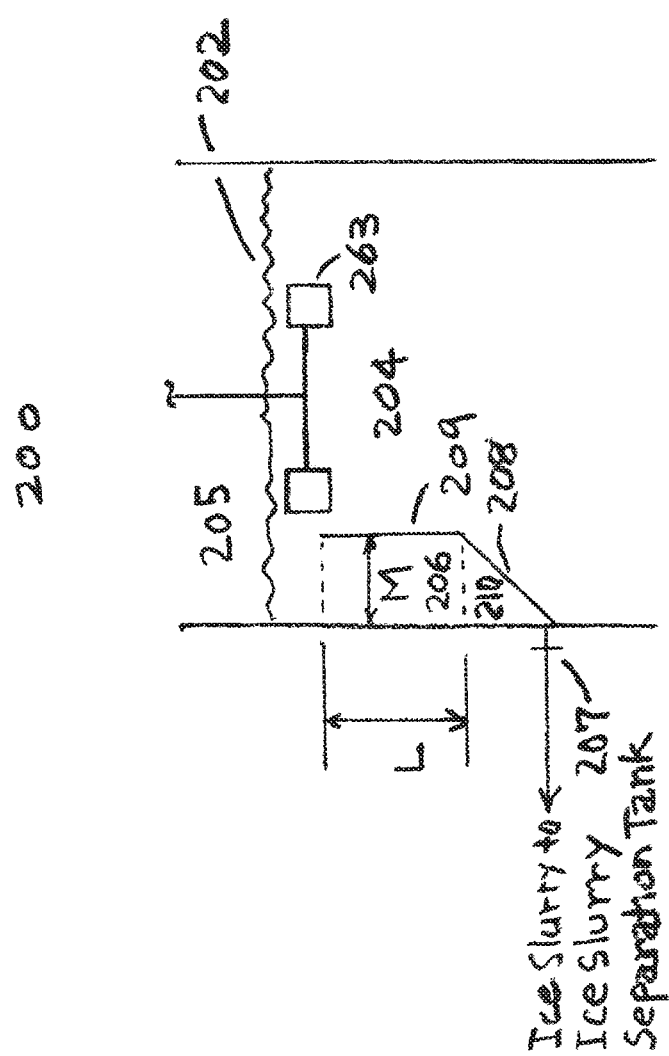
FIG. 2 is a schematic diagram of an ice slurry downcomer.

In order to separate the light solvent bubbles entrained in the ice slurry stream being withdrawn from the ice slurry production tank 101, a downcomer 109 is installed at the wall of the tank. The downcomer system 200 is shown in detail in FIG. 2, which comprises a straight vertical wall 209, sloped wall 208, and outlet nozzle 207. The downcomer provides a disengaging space 206, where any entrained solvent droplets are separated from the ice slurry stream by buoyant forces. In order for the buoyant forces to work most effectively, the downward vertical velocity of the ice slurry flow in the disengaging space must be maintained below the terminal velocity of the light solvent bubbles but higher than the hindered settling velocity of the largest ice particle to recover. The terminal velocity for the solvent bubble in this case is defined as the vertically rising velocity of a bubble of the density lighter than the surrounding fluid owing to the buoyant forces overcoming the frictional drag forces in the quiescent fluid, when the solvent bubble does not interact with other solvent bubbles because the concentration of the bubble is low in the surrounding fluid. The hindered settling velocity for the ice particle is defined as the vertically rising velocity of a particle of the density lighter than the surrounding fluid owing to the buoyant forces overcoming both the frictional drag and interaction forces in the quiescent fluid, when the ice particle interact with other ice particles with its motion hindered by the interactions. The velocities are calculated by the methods well known to those who are familiar with the field of this art as explained in Perry's Chemical Engineers' Handbook (in the section of Particle Dynamics, Seventh Edition, 1999, McGraw Hill).

The terminal and the hindered settling velocities are calculated using toluene as a light solvent to produce a product of 15 wt. % ice slurry in NaCl brine. The velocities of a spherical toluene bubble of 5 mm in diameter are tabulated in Table 1. The velocities of the ice particles of 2 mm, 1 mm, 0.5 mm and 0.1 mm in diameter are also tabulated in the table. In the ice slurry downcomer 109 and the ice slurry separation tank 151, the surrounding fluid for the toluene bubbles is the ice slurry of 15 wt. % ice at −5° C. The surrounding fluid for the ice particles, on the other hand, is assumed to be the same as the brine of 7.9 wt. % NaCl at −5° C. neglecting the effects of toluene bubbles; based on the preliminary design of the ice slurry production tank made for this invention, the average density change of the surrounding fluid due to the existence of the liquid toluene bubbles is within a few percent so the density reduction has been neglected. For the toluene bubbles, the terminal velocity is more appropriate to use in the downcomer and the ice slurry separation tank because their concentrations must be low, but the hindered settling velocity is more representative in the brine layer of the ice slurry production tank. For the ice particles, the hindered settling velocities are used in all three places. The physical properties needed for the calculation are given in Table 3 and Table 4.

TABLE 1

Terminal and Hindered Settling Velocities

| Settling Object | Size | Reynolds Number | Terminal Velocity | Hindered Settling Velocity |
| --- | --- | --- | --- | --- |
| Toluene Bubble | 5 mm | 137 | 0.102 m/s | 0.072 m/s |
| Ice Particle | 2 mm | 18.3 | 0.040 m/s | 0.021 m/s |
| Ice Particle | 1 mm | 5.2 | 0.023 m/s | 0.011 m/s |
| Ice Particle | 0.5 mm | 0.7 | $6.7 \times 10^{-3}$ m/s | $2.9 \times 10^{-3}$ m/s |
| Ice Particle | 0.1 mm | 0.02 | $3.4 \times 10^{-4}$ m/s | $1.4 \times 10^{-4}$ m/s |

As shown in the table, the terminal velocity of a toluene bubble of 5 mm in diameter is 0.102 m/s in an ice slurry of 15 wt. % ice at −5° C., and the hindered settling velocity of an ice particle of 1 mm is 0.011 m/s. Therefore, the downward ice slurry flow velocity in the downcomer must be maintained between these two velocities, because the ice slurry flow must carry the ice particles of 1 mm in diameter and smaller with it, while release the toluene bubbles of 5 mm in diameter and larger to float. The volume of disengaging space 206 in the straight vertical wall section depends on the width M and height L for a given circumferential length, and provides enough residence time for the withdrawing ice slurry flow so that the rising light solvent bubbles can escape. Also, the width M determines the cross sectional area of the flow passage for a given circumferential length, which will again determine the average velocity of the ice slurry flow. The height L of the disengaging space, on the other hand, determines the residence time for a solvent bubble to rise to the top of the ice slurry downcomer. For the disengaging height L, a height more than 0.3 m is typically provided. The downward ice slurry fluid then collects at space 210 of the sloped wall, and is discharged through nozzle 207 with no stagnant space. Agitator 263 operates in low RPM to push ice slurry 204 to downcomer 209 below interface 202 with light solvent layer 205.

Figure 3:
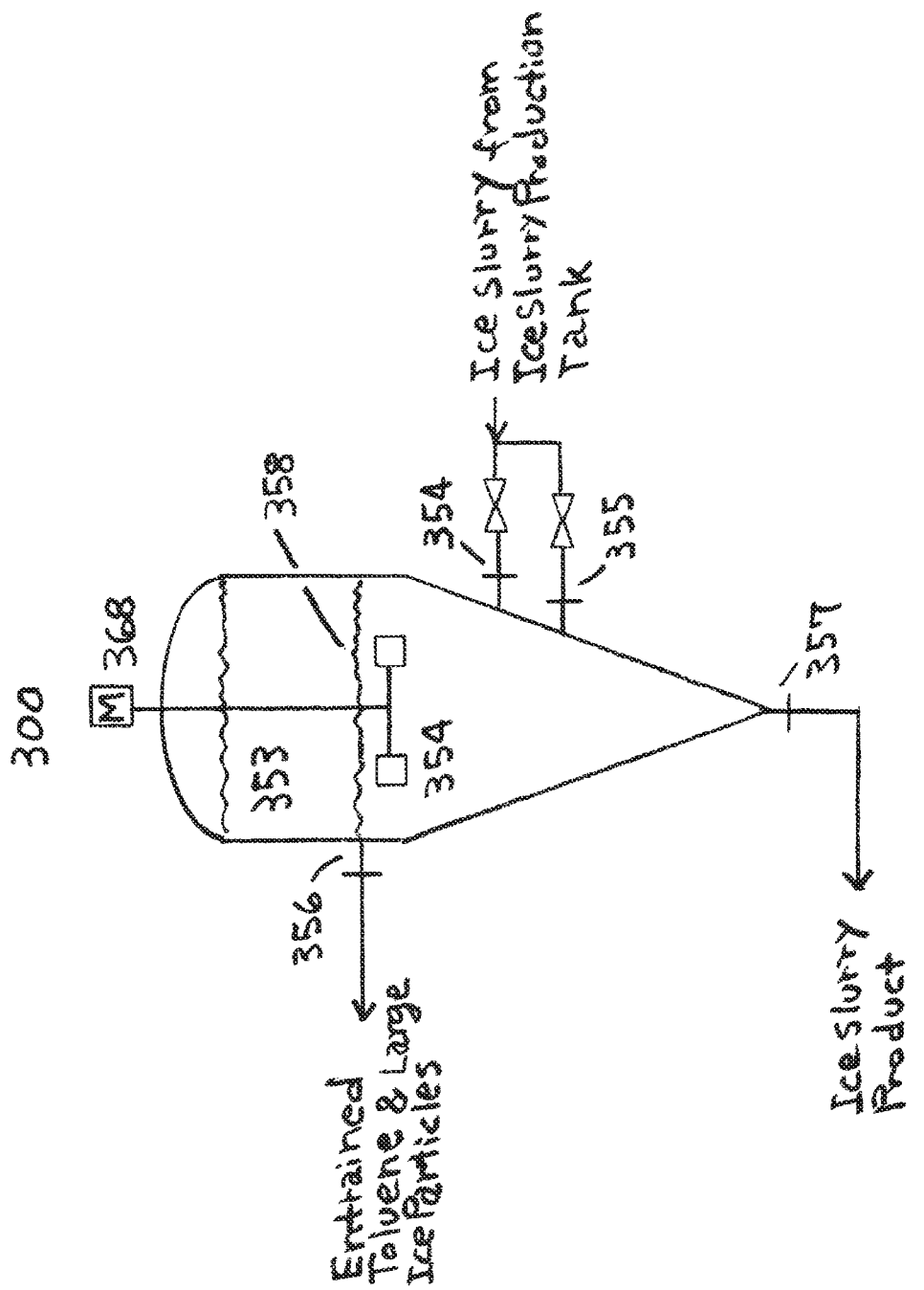
FIG. 3 is a schematic diagram of an ice slurry separation tank having an inverted cone at the bottom section.

The ice slurry separation tank system 300 is shown in FIG. 3. Stream 114 in FIG. 1 is sent to ice slurry separation tank 151 by pump 106, and fed into nozzle 354 in FIG. 3. The inlet nozzle 354 provides a horizontal cross-sectional area of the inverted circular cone through which the inlet ice slurry stream develops the flow velocity necessary to carry the ice particles of the desired sizes. When it is desired to carry the particles of larger sizes, the inlet slurry stream can be introduced into nozzle 355, which will provide a smaller cross-sectional area to carry the larger particles at a higher flow velocity. For example, the ice slurry stream of 110 LPM of 15 wt. % ice slurry with a production rate of 1 ton of ice/hr can be fed into the nozzle 354 that will develop the downward flow velocity of 0.011 m/s, which is the hindered settling velocity to carry the ice particles in diameter of 1 mm and less and release the toluene bubble of 5 mm and larger to rise at its terminal velocity of 0.102 m/s. When it is desired to carry ice particles of 2 mm and lower, the ice slurry stream is fed into nozzle 355 which will develop a flow velocity of 0.021 m/s the hindered settling velocity of the larger ice particle. Therefore, the light solvent bubbles are separated twice, once in the downcomer and again in the ice slurry separation tank. In the meantime, the ice slurry product can be kept homogeneous owing to this inverted cone section, and then pumped directly to the cold energy users 170 and 180 through the outlet nozzle 357. The toluene bubbles collected in the top layer 353 and the large size ice particles floating below the toluene layer are pumped in stream 167 through exit nozzle 356. Agitator 368 operates in low RPM to push the ice particles to exit nozzle 356 below the interface 358 between ice slurry layer 354 and toluene layer 353. The large ice particles are melted by mixing with the warm returning brine stream 166 in the line of stream 108, and the combined stream is fed into ice slurry production tank 101.

Returning brine stream 166 of 6.7 wt. % NaCl, combined with stream 167, is fed into ice slurry production tank 101 as a feed stream 108 at around 1° C. Since the agglomerating large ice particles melt at this time, no agglomeration of the ice particles takes place in the closed system of this ice slurry manufacturing process. In heat exchange with homogeneous ice slurry product stream 165, ice slurry user 170 cools a cold liquid HTF for use in the low temperature consumers, and user 180 generates a cold air stream for the cold air consumers. The number and types of the users can change while the ice slurry is supplied in series or parallel to the users between the supply stream 165 and the return stream 166.

The ice slurry manufacturing process of this invention needs two solvents one heavier in density than water and the other lighter than ice. The heavy solvent, light solvent and water are immiscible with each other. The freezing point depressant, on the other hand, must be soluble in water, but insoluble in the solvents. We have found that the system comprising perfluorohexane (C6F14), toluene, and water with NaCl as a freezing point depressant satisfies these requirements. By being immiscible, it means that the liquid solutions make distinct liquid phases after thorough mixing; the distinct liquid phases, however, can still dissolve the components between each other. The miscibility is strongly dependent on temperature. Therefore, an immiscible binary mixture at a low temperature may form a miscible mixture at higher temperatures. The mutual solubility of perfluorohexane ($C_6F_{14}$), toluene and water is illustrated in Table 2.

TABLE 2

Mutual Solubility of Solvents and Water (1)

|  | $C_6F_{14}$ | Toluene | Water |
|---|---|---|---|
| in $C_6F_{14}$ | N/A | 2.0 (1) | 10 ppm (2) |
| in Toluene | 1.2 (1) | N/A | 567 ppm (2) |
| in Water | <5 ppm (2) | 520 ppm (3) | N/A |

Note:
(1) Solubility in volume % at room temperature
(2) At 25° C.
(3) At 20° C.

The relevant physical properties of the four components being used in the process of this invention perfluorohexane ($C_6F_{14}$), toluene, water and ice are listed in Table 3.

TABLE 3

Physical Properties of $C_6F_{14}$, Toluene, Water and Ice

| Property | $C_6F_{14}$ | Toluene | Water | Ice |
|---|---|---|---|---|
| Molecular Weight | 338 | 92.1 | 18 | 18 |
| Density (Kg/M³) | 1680 (1) | 886 (2) | 999.8 (3) | 916.2 (2) |
| Melting Point (° C.) | −90 | −95 | 0 | 0 |
| Boiling Point (° C.) | 56 | 111 | 100 | 100 |
| Flash Point (° C.) | N/A | 6 | N/A | N/A |
| Auto Ignition Point (° C.) | N/A | 530 | N/A | N/A |
| Specific Heat Capacity (KJ/Kg. ° C.) | 1.1 (1) | 1.6 (2) | 4.2 (3) | 2.05 (2) |
| Therm. Cond. (W/M. ° C.) | 0.057 (1) | 0.144 (2) | 0.57 (3) | 2.22 (2) |
| Viscosity (mPa · s) | 0.64 (1) | 0.77 (2) | 1.79 (3) | N/A |

Note:
(1) At 25° C.
(2) At 0° C.
(3) At 0.01° C.

Physical properties of the ice slurry must be known for process design of the ice slurry manufacturing plant. For density, specific heat capacity, thermal conductivity and viscosity, the following equations are used, where $\rho$, $C_p$, $k$ and $\mu$ stands for density in Kg/M3, specific heat capacity in KJ/Kg·K, thermal conductivity in W/m·K, and viscosity in Pa·s, respectively, while subscripts b, i, and m for brine, ice, and mixture of ice slurry, respectively. For density $\rho$, the weight fraction averaged value is expressed by the following equation $$\rho_{m=1}/W_i/\rho_i + (1-W_i)/\rho_b]$$

where Wi stands for weight fraction. For specific heat capacity, the following equation is used.

$$Cpm = WiCpi + (1-Wi)Cpb$$

For thermal conductivity k, the following equation is recommended, where Wiv stands for volumetric fraction.

$$k_m = k_b\{[2k_b + k_i - 2W_{iv}(k_b - k_i)]/[2k_b + k_i + W_{iv}(k_b - k_i)]\}$$

For dynamic viscosity μ, the following equation is used.

$$\mu_m = \mu_b(1 + 2.5W_{iv} + 10.05W_{iv}^2 + 0.00273 \cdot 10^{-3} \cdot e^{16.6W_{iv}})$$

The calculated values of the physical properties are given in Table 4.

TABLE 4

Physical Properties of Brine, Ice, Ice Slurry and Toluene at −5° C.

| Property | 7.9 wt. % NaCl Brine | Ice | 15 wt. % Ice Slurry | Toluene |
|---|---|---|---|---|
| Density (Kg/M$^3$) | 1062 | 917.5 | 1037.7 | 890.5 |
| Heat Capacity(KJ/Kg · K) | 3.76 | 2.07 | 3.51 | 1.61 |
| Therm. Cond. (W/M · K) | 0.54 | 2.25 | 0.58 | 0.14 |
| Viscosity (mPa · s) | 2.32 | N/A | 4.09 | 0.83 |
| Heat of Fusion (KJ/Kg) | N/A | 333.6 | (1) N/A | N/A |

Note:
(1) At 0° C.

In addition to perfluorohexane ($C_6F_{14}$) as an immiscible heavy solvent, the mixtures of a perfluorocarbon such as perfluorohexane ($C_6F_{14}$) and a hydofluoroether such as perfluorobutyl methyl ether($C_4F_9OCH_3$) make binary liquid solutions that are immiscible with toluene and water. For example, the binary mixture comprising perfluorohexan ($C_6F_{14}$) and 3-ethoxy-1,1,1,2,3,4,4,5,5,6,6,6-dodecafluoro-2-trifluoromethyl hexane ($C_3F_7CF(OC_2H_5)CF(CF_3)_2$) or perfluorohexane ($C_6F_{14}$) and perfluorohexylethyl 1,3-dimethylbuthyl ether also makes a miscible binary solution which is immiscible with toluene and water in certain concentrations. Therefore, the binary mixtures are good candidates for the heavy solvent. Especially, the hydrofluoroethers are lower in price than the perfluorocarbons.

Figure 5:
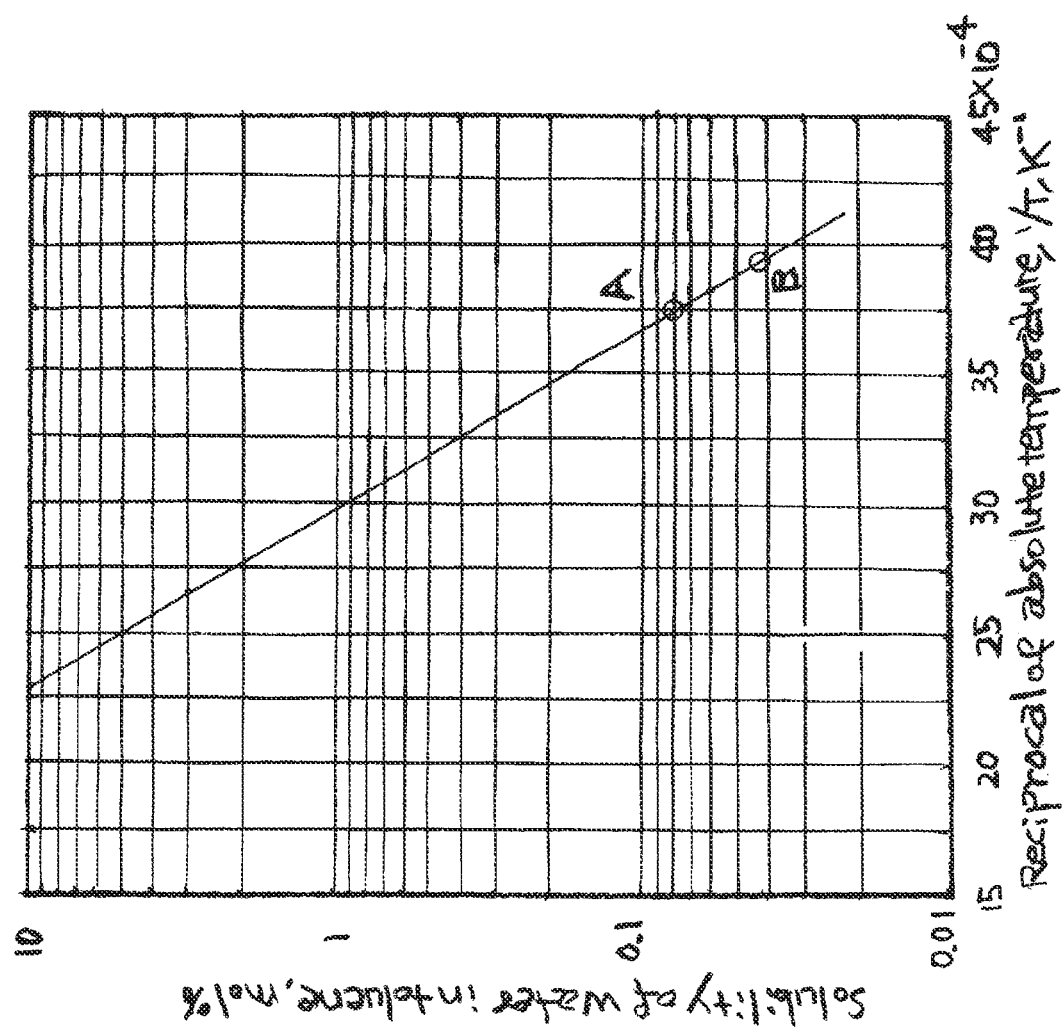
FIG. 5 is a diagram of solubility of water in toluene.

For a proper operation of the ice slurry manufacturing process, the chiller must be designed such that the blockage does not take place due to the ice adhesion and accumulation. This problem is more significant when the amount of undissolving water in the solvent is high. For example, toluene dissolves water in a range of a hundred ppm at the operating temperatures, while perfluorohexanein around 10 ppm. When the toluene stream is chilled from −5° C. to −15° C. in the chiller, the solubility of water decreases from 152 ppm (point A) to 82 ppm (point B) as shown in FIG. 5. For production of 1 ton of ice/hr for 15 wt. % ice slurry product, the feed brine of 6.7 wt. % NaCl is cooled first in a precooler from 1° C. to −4° C., which is 0.2° C. warmer than the liquidus temperature, and then further chilled in the ice slurry production tank from −4° C. to −5° C. for ice formation. In order to supply cold energy for the ice formation, about 420 LPM of toluene must be recirculated through the chiller with the chiller inlet temperature of −5° C. and outlet temperature of −15° C. The recirculating toluene stream, in this case, generates about 1.6 Kg/hr of water. When this amount of water remains as solid ice in the chiller, it is a sufficient amount to block the passages of the solvent in a few hours.

Owing to the icephobicity of the coated surfaces in this invention, the undissolving water and the subsequent ice particles do not adhere on the cold surfaces, but are all carried away into the ice slurry production tank. The unique operation methods described below enable the coated surfaces to exhibit the icephobicity in actual applications in subzero conditions. According to an experiment for the drop shedding by Milne and Amirfazli, a water drop of 2 microliters (μl) was carried away by an air stream at the velocities above 5 m/s from superhydrophobic surface and 20 m/s from the hydrophilic surface. This result suggests that, even with superhydrophobic surfaces, the water drop will possibly be sessile and then freeze into ice if there are not enough drag forces by the surrounding fluid. It also suggests that it is more probable with hydrophilic surfaces for the water drops to be sessile and freeze. This conclusion is consistent with the observations made by other researchers that icephobicity is not directly related with hydrophobicity. This is because the icephobicity also depends on other factors from the environment where the surfaces are exposed to. In this invention, therefore, all possible options are incorporated in order to prevent ice adhesion on the cold heat transfer surfaces.

Figure 6:
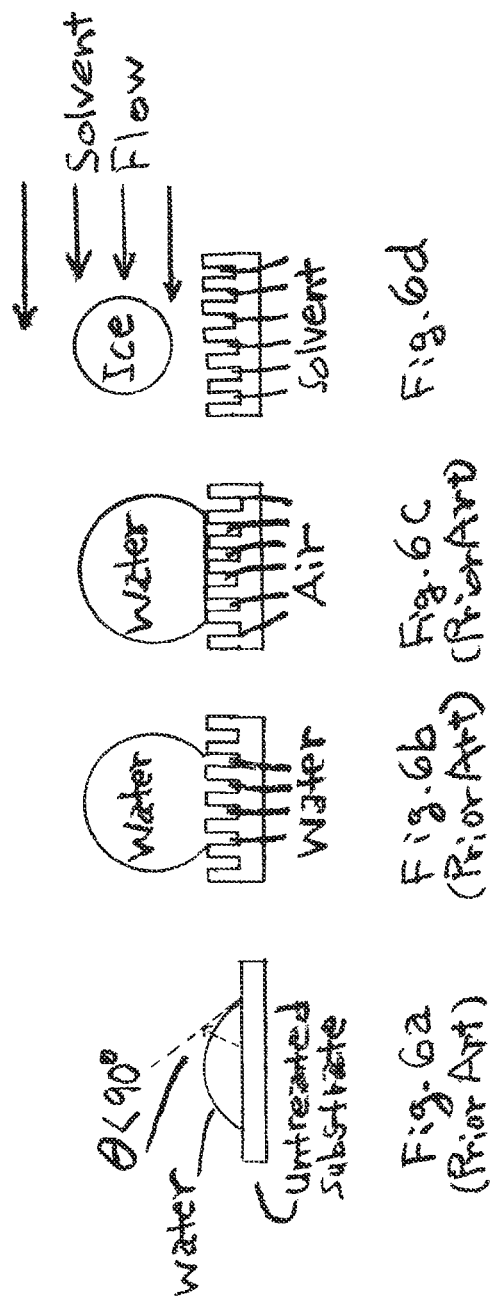
FIG. 6a is a schematic diagram of a sessile water drop sitting on a smooth hydrophilic surface of uncoated base substrate in air.
FIG. 6b is a schematic diagram of Wenzel state where a water drop contacts the bottom of the ridges, with water replacing air in the spaces between the ridges, on a rough surface in air.
FIG. 6c is a schematic diagram of Cassie-Baxter state where a water drop sits on the top of the ridges, with the spaces between the ridges occupied with air, on a rough surface in air.
FIG. 6d is a schematic diagram of a water drop or an ice particle carried away by a chilled solvent flow from an icephobic surface that is completely submerged in a flowing immiscible solvent.

In this invention, the hydrophobicity of the coated surfaces of the solvent side of the chiller is transferred to icephorbicity by submerging the surfaces in the flowing immiscible solvent. This icephorbicity ensures that the free water molecules undissolving in the chilled solvent are readily carried away by the main flow of the immiscible solvent stream by drag forces before the water droplets become sessile locally on the cold heat transfer surfaces. Hydrophobic coatings are known to form rough surfaces comprising of random ridges as shown in FIG. 6b to FIG. 6d; with air filled in the spaces between the ridges, this roughness makes water drops in micron sizes to sit on the top of the ridges as shown in FIG. 6c making a Cassie-Baxter state rather than being sessile on an untreated surface as shown in FIG. 6a in a completely wet state or in FIG. 6b on a treated surface in a Wenzel state. Those rough surfaces are produced by applying the hydrophobic coating material on the surfaces of a hydrophilic base substrate. The hydrophilic surfaces of such a base substrate are illustrated in FIG.

6a, where a water drop in air spreads out on a flat surface and become sessile with the contact angle θ less than 90°.

The hydrophobic coating materials are readily available in marketplaces, being made from a wide range of different materials comprising of polymeric materials such as PTFE and silanes, inorganic materials such as silica and titania, or their combinations thereof. The hydrophobic surfaces as represented in FIG. 6c in a Cassie-Baxter state lose their water repelling capability, when the air in the pore spaces between the ridges is displaced by water as shown in FIG. 6b in a Wenzel state. For example, in nature, such hydrophobic surfaces lose their ability to repel water after they are exposed to a torrential rain or strong waves on a ship. Also, such hydrophobic surfaces lose their ability due to the loss of air molecules by diffusion into the water phase, when the surfaces are submerged in water. Another cause for the loss of hydrophobicity is the destruction of the ridge structure due to the repetition of freezing and deicing procedures. Therefore, for the ice slurry manufacturing process of this invention, the coated surfaces of the chiller is not allowed to contact the brine water directly for heat transfer. Instead, the brine is kept away from the coated surfaces, and only the flowing immiscible solvent is allowed to contact them. This unique operation method of this invention makes it possible to maintain the icephobicity on the coated surfaces, and consequently the free water molecules liberated in the chilled solvent stream do not become sessile on the cold heat exchange surfaces but are carried away with the main stream of solvent as shown in FIG. 6d.

Therefore, the equipment is designed to develop sufficient drag forces so that the water droplets forming from the undissolving free water molecules are readily carried away by the main flow of immiscible solvent stream. The circulation pump needs to perform adequately so that a sufficient velocity of the solvent flow can be maintained for generation of drag forces on the undissolving water droplets and the subsequent ice particles that form during chilling. Also, the tube bundles must be carefully designed so that no stagnant spaces develop in the passages of the solvent. Therefore, a design such as U-tube is preferred.

In summary, the problem of the blockage by ice adhesion in the chiller is overcome in this invention by providing the environments for the hydrophobic coated surfaces to exhibit the necessary icephorbicity while in operation. The environments are successfully provided by taking the following measures; firstly, the coated surfaces are let remain immersed in the flowing immiscible solvent all the time; secondly, sufficiently high velocity of the immiscible solvent flow is maintained in order for the free water droplets and ice particles to be carried away by drag forces; thirdly, no stagnant spaces are allowed in the solvent side of the chiller where otherwise water drops could possibly become sessile due to the stagnation of solvent flow.

The additional heat transfer resistance due to the coating layer must be carefully addressed in this invention. A coating layer of a thickness of 150 microns with a thermal conductivity of 0.2 W/m·K yields a 25% increase of heat transfer resistance on a regular shell and tube heat exchanger for such chilling services. Fortunately, some of the hydrophobic coating materials, for example PTFE (polytetrafluoroethylene), provide an excellent corrosion resistance against the aqueous solutions of many salts. Such corrosion resistant materials have been used throughout the industries for many decades. With the additional benefit of corrosion resistance, the coating material provides an opportunity to generate the ice slurry resolving the chronic problems of the ice adhesion and the corrosion by salt solutions at the same time.

Figure 7:
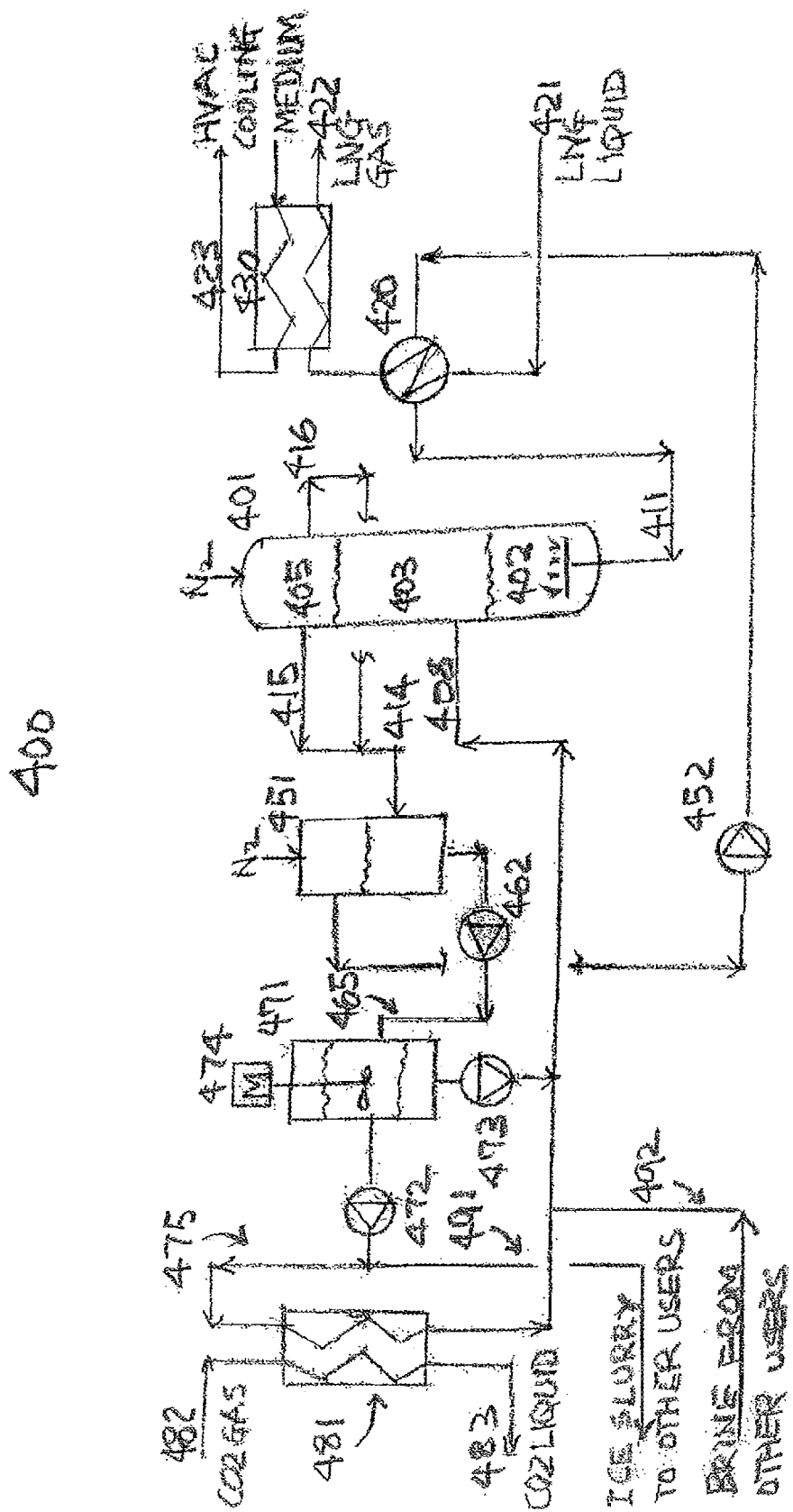
FIG. 7 is a schematic flow chart of an ice slurry manufacturing process of the present invention comprising an ice slurry production tank, an ice slurry separation tank, an ice slurry storage tank, a $CO_2$ liquefaction heat exchanger, a LNG regasification heat exchanger, and a natural gas superheater heat exchanger.

In another embodiment, system 400 in FIG. 7 comprises of an ice slurry production tank 401, an ice slurry separation tank 451, an ice slurry storage tank 471, a $CO_2$ liquefaction heat exchanger 481, a LNG regasification heat exchanger 420, and a natural gas superheater heat exchanger 430. The LNG regasification heat exchanger chills toluene stream 411, while it vaporizes LNG stream 421 at −162° C. to natural gas. Since the freezing point of toluene is −95° C., its flow rate must be maintained high enough to prevent it from freezing. In the ice slurry production tank 401, the chilled toluene is sprayed by distributor nozzles which are submersed in the cold heavy solvent layer 402. The heavy solvent layer prevents water drops from reaching the cold distributor nozzles and thereby from freezing in the cold heavy solvent layer. The cold light solvent bubbles rise by buoyant forces through the heavy solvent layer 402 and then through the water layer 403 generating ice crystals in direct contact heat transfer. The stream 415 and 416 of ice slurry collected at the interface with toluene layer 405 are combined and withdrawn to ice slurry separation tank 451 in stream 414. The toluene layer in tank 451 is withdrawn and recycled to the LNG regasification heat exchanger 420 by pump 452. The ice slurry layer in tank 451 is withdrawn and sent to ice slurry storage tank 471 by pump 462 in stream 465. The ice slurry in tank 471 is mixed with agitator 474 to maintain a uniform ice concentration of 15 wt %. The ice slurry stream 475 is sent by pump 472 to liquefy $CO_2$ gas 482 to $CO_2$ liquid 483 in $CO_2$ liquefaction heat exchanger 481 at around −30° C. and 15 bar. The $CO_2$ is condensed at 15 bar because the liquid $CO_2$ storage tank in the liquid $CO_2$ ocean carrier is designed at 15 bar. The saturation temperature of $CO_2$ at 15 bar is −28.5° C. The ice slurry stream 491 is used as a low temperature coolant for other users such as the freeze and refrigeration warehouses at service temperatures from −40° C. to −5° C. It is also used as a low temperature coolant for industries at temperatures up to −45° C. It returns as a 38 wt % potassium formate brine of stream 492. Any water formed from melting ice is sent to the ice slurry production tank by pump 473. The combined returning brine stream 408 is fed to the water layer 403 containing ice in the ice slurry production tank. The natural gas exiting regasification heat exchanger 420 is heated by HVAC coolant stream 423 in superheater heat exchanger 430 from around −65° C. to +2° C., and then natural gas stream 422 is sent to the natural gas users. The HVAC coolant stream is cooled to a temperature below 0° C., while it is used for cooling data centers and HVAC of commercial and apartment buildings.

Figure 8:
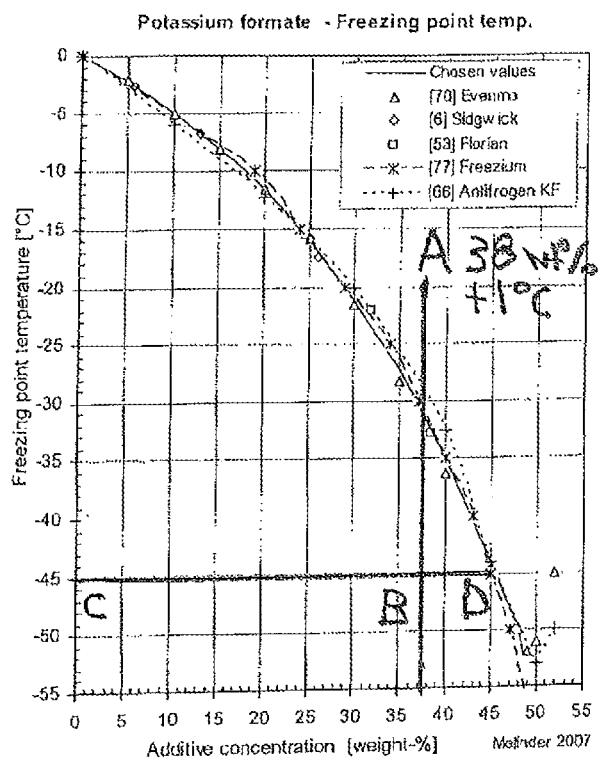
FIG. 8 is a phase diagram of a eutectic system of potassium formate—water.

In FIG. 8 is shown a phase diagram of a eutectic system of potassium formate—water. The brine at point A of 38 wt % and +1° C. is fed into the water layer in the ice slurry production tank and cooled to point B at −45° C. Point B, physically, separates into two phases comprising pure ice at point C and a solution of 45 wt % potassium formate at point D. The ice slurry represented by point B contains 15 wt % of ice particles. This ice slurry is withdrawn from ice slurry production tank 401 and sent to ice slurry separation tank 451.

This 15 wt % ice slurry is separated in ice slurry separation tank 451 from the toluene stream and then stored in ice slurry storage tank 471. The 15 wt % ice slurry can deliver two to three times higher enthalpy than the single phase HTF (Heat Transfer Fluid), when it is used as a coolant from −45° C. to −30° C. with a temperature rise of 15° C. This capability makes ice slurry more favorable to use, when the installation cost of the plant needs to be reduced. The ice slurry returns from the cold energy users as 38 wt % brine at +1° C. The potassium formate—water system has a eutectic point at 52 wt % and −60° C. For the freezing point depressant, a substance can be selected from a group composing LiCl, NaCl, $K_2CO_3$, $CaCl_2$), $MgCl_2$, KAc (potassium acetate) and KCOOH (potassium formate).

LNG vaporizes in LNG regasification heat exchanger 420 and then the vaporized natural gas is superheated in natural gas superheater heat exchanger 430. In the LNG regasification heat exchanger, the LNG stream at −162° C. at a pressure from 30 bar to 70 bar is vaporized in heat exchange with the toluene stream at a temperature of −45° C. at a pressure lower than 10 bar. The natural gas from the LNG regasification heat exchanger 420 is superheated by superheater heat exchanger 430 to a temperature higher than +2° C. by an aqueous solution which is used as a coolant for cooling data centers and HVAC of commercial and apartment buildings being maintained at a room temperature of around +20° C. The aqueous solution dissolves a freezing point depressant selected from a group composing LiCl, NaCl, $K_2CO_3$, $CaCl_2$), $MgCl_2$, ethylene glycol, propylene glycol, KAc (potassium acetate) and KCOOH (potassium formate). The aqueous solution is chilled to a temperature below 0° C. in natural gas superheater heat exchanger 430.

The LNG cold energy is recovered as much as around 160 kcal/kg, when it is vaporized from −162° C. to −65° C. at 30 bar in the LNG regasification heat exchanger. Additionally, the LNG cold energy is further recovered as much as 40 kcal/kg from −65° C. to +2° C. at 30 bar in the natural gas superheater heat exchanger. Typically, the LNG cold energy is recovered as much as 200 kcal/kg in total. At −65° C. and 30 bar, the LNG is completely vaporized. Since the behavior of LNG on the temperature and enthalpy diagram depends on the concentration of the heavier components such as ethane, propane and butane, the composition must be checked routinely prior to use.

For production of ice slurry in the ice slurry production tank, three liquids perfluorohexane ($C_6F_{14}$), toluene, and water being immiscible between each other are contacted by direct contact heat transfer in a cylindrical tank 401; firstly, the water mixture containing potassium formate as a freezing point depressant and ice particles of 1 mm to 100 microns in diameter at the middle layer, secondly the heavy solvent of perfluorohexane ($C_6F_{14}$) at the bottom layer, and thirdly the light solvent of toluene at the top layer. The distributor for toluene is submerged in the heavy solvent layer and sprays the cold toluene bubbles through the nozzles properly without clogging by freezing water. It is possible due to the fact that the immiscible heavy solvent layer prevents the water drops from contacting the cold distributor nozzles owing to the density difference. The cold toluene bubbles ascend through the heavy solvent layer, and then through the ice slurry layer generating ice particles. The toluene bubbles collect at the top layer. The ice slurry and toluene layers are maintained at −45° C.

The light solvent is fed to the LNG regasification heat exchanger at −45° C. and exits at temperatures around −65° C. LNG is fed into the LNG regasification heat exchanger at −162° C. and exits at temperatures around −65C The light solvent stream carries the cold energy from LNG, and transfers it to the ice slurry layer in the ice slurry production tank. The heavy solvent layer stays at the bottom of the ice slurry production tank at temperatures around −65° C. This temperature is determined with the optimum circulation flow rate of toluene for a given amount of cold energy recovered. The ice slurry is produced, separated and stored at −45° C. The ice slurry is used to condense the $CO_2$ gas for CCUS (Carbon Capture, Utilization, and Storage) at around −30° C. and 15 bar. When the LNG flow rate fluctuates, the toluene flow rate changes in response to the fluctuation, while the inlet and outlet temperatures of toluene are kept constant in the LNG regasification heat exchanger.

In Table 5, the physical properties of the 45 wt. % potassium formate aqueous solution, ice, 15 wt. % ice slurry, and toluene at −45° C. are given.

TABLE 5

Physical Properties of Brine, Ice, Ice Slurry and Toluene at −45° C.

| Property | 45 wt. % P. F. Brine | Ice | 15 wt. % Ice Slurry | Toluene |
| --- | --- | --- | --- | --- |
| Density (Kg/M$^3$) | 1324 | 918.0 | 1085.8 | 930 |
| Heat Capacity(KJ/Kg · K) | 2.7 | 2.45 | 2.66 | 1.55 |
| Therm. Cond. (W/M · K) | 0.43 | 2.76 | 0.366 | 0.150 |
| Viscosity (mPa · s) | 30 | N/A | 45.3 | 1.75 |
| Heat of Fusion (KJ/Kg) | N/A | 247.2 | N/A | N/A |

The terminal velocity and the hindered settling velocity of the toluene bubble in size of 5 mm and of the ice particles in sizes of 2 mm, 1 mm, 0.5 mm, and 0.1 mm are given in Table 6. The ice particles are produced in the 45 wt. % potassium formate aqueous solution in direct contact heat transfer at −45° C.

TABLE 6

Terminal and Hindered Settling Velocities at −45° C.

| Settling Object | Size | Reynolds Number | Terminal Velocity | Hindered Settling Velocity |
| --- | --- | --- | --- | --- |
| Toluene Bubble | 5 mm | 13.6 | 0.073 m/s | 0.0029 m/s |
| Ice Particle | 2 mm | 1.5 | 0.02 m/s | 0.0096 m/s |
| Ice Particle | 1 mm | 0.37 | 0.01 m/s | 0.0048 m/s |
| Ice Particle | 0.5 mm | 0.053 | $2.8 \times 10^{-3}$ m/s | $1.2 \times 10^{-3}$ m/s |
| Ice Particle | 0.1 mm | 0.0003 | $7.1 \times 10^{-5}$ m/s | $3.2 \times 10^{-5}$ m/s |

The ice slurry separation tank 451 separates the ice slurry stream from the toluene stream. The terminal velocity of a toluene bubble of 5 mm in diameter is about 0.073 m/s in the ice slurry mixture of 45 wt % potassium formate at −45° C. The hindered settling velocity of an ice particle of 1 mm in diameter is 0.0048 m/s in the water dissolving potassium formate in 45 wt % at −45° C. For the downward ice slurry flow at the bottom section of the tank, the bulk flow velocity is maintained higher than 0.0048 m/s but below 0.073 m/s so that all ice particles smaller than 1 mm in diameter can be withdrawn with the bulk ice slurry stream but all toluene liquid drops larger than 5 mm in diameter can be released from the ice slurry stream. For the upward toluene flow exiting through the nozzle located at the top section of the tank, the exit nozzle is located where the elevation of the nozzle can prevent the blanketing nitrogen gas and the ice slurry mixture from being entrained into the toluene stream, which will be chilled in the LNG regasification heat exchanger at −162° C. Otherwise, the entrainment will cause water freezing on the toluene side heat transfer surfaces, thus deteriorating heat transfer. Also, due to the low terminal velocity of the toluene bubbles and hindered settling velocities of the ice particles owing to the high viscosity of potassium formate solution, a cylindrical tank is provided for more effective separation of the ice slurry from the toluene stream with a sufficient residence time.

The ice slurry storage tank 471 stores ice slurry at −45° C. The capacity of the storage tank is determined by the two requirements; firstly, it must provide the cold energy users such as the freeze and refrigeration warehouses, cold energy industries, and $CO_2$ liquefaction heat exchangers for CCUS with an enough residence time. For example, the cold energy to condense $CO_2$ gas must be available whenever the CO2 gas is delivered to $CO_2$ liquefaction heat exchanger 481. In the meantime, the storage tank must have enough capacity to store the excess cold energy being generated in the regasification process all the time. Since the cold energy users and the cold energy producers are working independently, the cold energy storage tank must provide enough buffer capacity for both sides to operate in coordination.

In another embodiment, a ternary system comprising perfluoroheptane ($C_7F_{16}$), toluene, and water can be used instead of the ternary system perfluorohexane ($C_6F_{14}$), toluene, and water for production of ice slurry. The $C_6F_{14}$ and $C_7F_{16}$ were marketed with the product name of FC-72 and FC-84, respectively, from 3M Corporation. Their solubilities with tolune are given in the brochure titled "SOLUBILITY" published by the company. From this reference, it has been found that the solubility of FC-72 ($C_6F_{14}$) and FC-84 ($C_7F_{16}$) in toluene is slightly soluble (1-5 g/100 g), respectively, while the solubility of toluene in FC-72 and FC-84 is slightly soluble (1-5 g/100 g), respectively, too. The binary system of $C_6F_{14}$ and toluene forms immiscible liquid phases as was found from the experiment of Chu et al. In addition, according to the solubility data of 3M Corporation, FC-84 and toluene will not form a miscible liquid mixture because of their solubilities being "slight soluble". Therefore, the binary system of FC-84 and toluene will form immiscible liquid phases following the experimental results of Chu et al., where the binary system of FC-72 and toluene forms immiscible liquid phases while having the same solubilities being "slight soluble" as the binary system of FC-84 and toluene in the 3M brochure.

The physical properties of $C_6F_{14}$ (FC-72) and $C_7F_{16}$ (FC-84) are shown in Table 7. They have very close values for the physical properties required for a heavy solvent such as pour point, liquid density, viscosity, coefficient of expansion, specific heat, thermal conductivity, surface tension, water solubility, and solubility in water.

TABLE 7

Physical Properties of $C_6F_{14}$ (FC-72) and $C_7F_{16}$ (FC-84) at 25° C.

|  | $C_6F_{14}$ (FC-72) | $C_7F_{16}$ (FC-84) |
|---|---|---|
| Appearance | Clear, Colorless | Clear, Colorless |
| Molecular Weight | 338 | 388 |
| Boiling Point,° C. (1 atm) | 56 | 80 |
| Pour Point,° C. | −90 | −95 |
| Critical Temperature,° C. | 176 | 202 |
| Critical Pressure, Bar | 18.3 | 17.5 |
| Vapor Pressure at 25° C., Bar | 0.31 | 0.11 |
| Latent Heat of Vaporization, J/g (2) | 88 | 90 |
| Liquid density, kg/m3 | 1680 | 1730 |
| Kinematic Viscosity, centistokes | 0.38 | 0.53 |
| Absoluto Viscosity, centipoises | 0.64 | 0.91 |
| Liquid Specific Heat, J/kg. ° C. | 1100 | 1100 |
| Liquid Thermal Conductivity, W/m. ° C. | 0.057 | 0.060 |
| Coefficient of Expansion, 1/(° C.) | 0.00156 | 0.0015 |
| Surface Tension, dynes/cm | 10 | 12 |
| Refractive Index | 1.251 | 1.261 |
| Water Solubility, ppmw | 10 | 11 |
| Solubility in Water, ppmw | <5 | <5 |

Note:
1. Physical properties FC-72 and FC-84 are from product brochures of 3M Corporation.
(2) At normal boiling point For the alternative system, the mutual solubility is given in Table 8. The binary system comprising $C_7F_{16}$ (FC-84) and toluene will form immiscible phases as for the system comprising $C_6F_{14}$ (FC-72) and toluene. The mutual solubility of the binary pair of $C_7F_{16}$ (FC-84) and toluene was found from the brochure titled "Solubility" printed by 3M Corporation. The mutual solubility of $C_7F_{16}$ (FC-84) and water is given in Table 7. For the binary pair of toluene and water, their mutual solubility is the same as given in Table 2.

TABLE 8

Mutual Solubility of $C_7F_{16}$, Toluene, and Water

|  | $C_7F_{16}$ | Toluene | Water |
|---|---|---|---|
| in C7F16 | N/A | 1-5 (1) | 11 ppm (2) |
| in Toluene | 1-5 (1) | N/A | 567 ppm (2) |
| in Water | <5 ppm (2) | 520 ppm (3) | N/A |

Note:
(1) Solubility in weight % at 25° C.
(2) At 25° C.
(3) At 20° C.

The relevant physical properties of the four components being used in the process of the alternative embodiment perfluoroheptane ($C_7F_{16}$), toluene, water and ice are listed in Table 9. For toluene, water and ice, their physical properties are the same as given in Table 3.

TABLE 9

Physical Properties of $C_7F_{16}$, Toluene, Water and Ice

| Property | $C_7F_{16}$ | Toluene | Water | Ice |
|---|---|---|---|---|
| Molecular Weight | 388 | 92.1 | 18 | 18 |
| Density (Kg/M³) | 1730 (1) | 886 (2) | 999.8 (3) | 916.2 (2) |
| Melting Point (° C.) | −95 | −95 | 0 | 0 |
| Boiling Point (° C.) | 80 | 111 | 100 | 100 |
| Flash Point (° C.) | N/A | 6 | N/A | N/A |
| Auto Ignition Point (° C.) | N/A | 530 | N/A | N/A |

TABLE 9-continued

Physical Properties of $C_7F_{16}$, Toluene, Water and Ice

| Property | $C_7F_{16}$ | Toluene | Water | Ice |
|---|---|---|---|---|
| Specific Heat Capacity (KJ/Kg. °C.) | 1.1 (1) | 1.6 (2) | 4.2 (3) | 2.05 (2) |
| Therm. Cond. (W/M. °C.) | 0.060 (1) | 0.144 (2) | 0.57 (3) | 2.22 (2) |
| Viscosity (mPa · s) | 0.91 (1) | 0.77 (2) | 1.79 (3) | N/A |

Note:
(1) At 25° C.
(2) At 0° C.
(3) At 0.01° C.

For the fluctuations of the LNG flow rate of stream 421, the system consisting of ice slurry production tank 401, LNG regasification heat exchanger 420, and toluene circulation pump 452 is controlled by the following control scheme. When the fluctuation starts, the toluene flow rate in the LNG regasification heat exchanger changes in response to the fluctuation, while the inlet and outlet temperatures of toluene are kept constant. In this way, a faster response can be obtained in the direct contact heat transfer operation in space 403 in the ice slurry production tank. If the temperatures change instead of the flow rate for the fluctuation, it would require much longer response time because the temperature of the whole liquid in the ice slurry production tank must change in order to see the change of ice slurry production rate as a response. Whereas, with the toluene flow rate changing, it will make the change of ice slurry production rate faster, because the ice slurry production rate depends on the number of toluene bubbles delivered in space 403 for direct contact heat transfer operation, which will be again directly dependent on the toluene flow rate into the toluene distributor. For the toluene pump, a centrifugal pump can be used, because a large flow rate of several thousand GPM (3.785 liter/min/GPM) with low head below 10 bar are required. Also, for pumping toluene liquid, stainless steel or carbon steel can be used for material of construction of the pump with the explosion proof provisions.

To achieve the Net Zero by 2050, meaning that the net emission of $CO_2$ into the atmosphere will be reduced to zero (0) by 2050, most countries in the world capture $CO_2$ from the industrial activities such as stack gases of power plants which contain $CO_2$ at a concentration of 10 to 14% in weight for CCUS. After the cleaning and purification processes in the capture step, the $CO_2$ stream is at a concentration of more than 95%. For CCS, this $CO_2$ stream must be stored in a liquid state before it is put into the geological formations. For CCU, some can be utilized in a gaseous state depending on the type of utilization process, while the rest must be stored in a liquid state until it is used in the utilization process. Liquefaction of this $CO_2$ stream requires an appreciable amount of electrical energy for compression and condensation. Instead, the $CO_2$ gas can be condensed by using the recovered LNG cold energy. In this case, the $CO_2$ gas must be condensed immediately as soon as it is processed in the capture step, because it cannot be stored in a gaseous state. As an option, the $CO_2$ gas from the capture step can be chilled first in the superheater heat exchanger 430 and then condensed in the $CO_2$ liquefaction heat exchanger 481.

The LNG regasification heat exchanger can be constructed of less corrosion resistant material of construction. For example, the heat exchanger tubes contacting seawater were made of titanium, but now for toluene stream they can be constructed of stainless steel. Also, the parts contacting LNG can be constructed of stainless steel as they have been. The costs of the equipment unit have become much lower now. As for the natural gas superheater heat exchanger, stainless steel can be used for the natural gas side, and stainless steel or carbon steel can be used for the heating medium side depending on the corrosivity of the heat transfer fluid (HTF).

The ice slurry production tank and ice slurry separation tank contain toluene which is a flammable substance. Therefore, the tanks need blanketing with nitrogen to prevent air from leaking into the system. Also, they need safety valves for over pressure emergencies which will lead to a flare system for safe combustion. Also, since LNG makes combustible gas mixture at a concentration between 4-15 volume % in the atmosphere, all electricity users including motors, instrumentation and IT (Information Technology) servers must be designed for explosion proof.

The process is a closed system in order to prevent the fluorocarbon from leaking into the atmosphere. The heavy solvent, perfluorohexane ($C_6F_{14}$) and perfluoroheptane ($C_7F_{16}$), have GWP (Global Warming Potential) of 9300 and 7820, respectively, and will stay at the bottom of the ice slurry production tank all the time, preventing leakage of the component into the atmosphere. Vapor pressure of $C_6F_{14}$ at −45° C. is 0.007 bar and of $C_7F_{16}$ 0.0014 bar, respectively, while they are immiscible with toluene and water having very low solubility with them. Also, the plant operates in a closed system securing safety by preventing the leakage of the heavy solvent component into the atmosphere.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

I claim:

1. A LNG (liquified natural gas) cold energy recovery system comprising:
   a. an LNG regasification heat exchanger, the LNG regasification heat exchanger receiving LNG at −162° C. and vaporizing the LNG to natural gas; and
   b. an ice slurry production tank having a top layer having a light solvent, a middle layer having water and a bottom layer having a heavy solvent being perfluoroheptane ($C_7F_{16}$),
   c. wherein the middle layer comprises water, ice particles and a freezing point depressant,
   d. wherein the top, middle and bottom layers are different liquids with different densities and immiscible to each other, and
   e. wherein toluene is chilled by the LNG regasification heat exchanger and fed into the bottom layer, thereby forming toluene bubbles having less density than the middle layer.

2. The LNG cold energy recovery system of claim 1, wherein the freezing point depressant dissolves in water and is insoluble in the top light solvent and in said heavy solvent; wherein the freezing point depressant is a substance selected from a group comprising LiCl, NaCl, $K_2CO_3$, $CaCl_2$, $MgCl_2$, KAc (Potassium Acetate), and KCOOH (Potassium Formate).

3. The LNG cold energy recovery system of claim 1, wherein in the LNG regasification heat exchanger the flow rate of the toluene changes in response to fluctuations of the flow rate of the LNG while the temperature of the toluene is kept constant.

4. The LNG cold energy recovery system of claim 1, further comprising a superheater heat exchanger,
   a) wherein the natural gas from said LNG regasification heat exchanger is heated to a temperature above +2° C. in the natural gas superheater heat exchanger;
   b) wherein the heating medium for said superheater heat exchanger is an aqueous solution of a freezing point depressant which can be cooled to a temperature below 0° C. at an exit of the superheater heat exchanger; and
   c) wherein the freezing point depressant is a substance selected from a group consisting LiCl, NaCl, ethylene glycol, propylene glycol, KAc (potassium acetate) and potassium formate (KCOOH).

5. The LNG cold energy recovery system of claim 1, further comprising an ice slurry separation tank for separating an ice slurry stream from a toluene stream from the ice slurry production tank;
   a. wherein the terminal velocity of a toluene bubble of 5 mm in diameter is Vt m/s whereas the hindered settling velocity of an ice particle of 1 mm in diameter Vs m/s;
   b. wherein, for the downward ice slurry flow at a bottom section of the ice slurry separation tank, the bulk flow velocity is maintained higher than Vs m/s but lower than Vt m/s; and
   c. wherein, for the upward toluene flow exiting through a nozzle located at the top section of the ice slurry separation tank, the nozzle is located where the level of the nozzle can prevent entrainment of blanketing nitrogen gas and the ice slurry.

6. The LNG cold energy recovery system of claim 5, further comprising an ice slurry storage tank for receiving ice slurry from the ice slurry separation tank, wherein:
   a. the ice slurry storage tank operates continuously for LNG cold energy recovery while charging and discharging ice slurry at the same time;
   b. the ice slurry storage tank is charged with ice slurry from the ice slurry separation tank;
   c. the ice slurry storage tank discharges ice slurry at least to cold energy users and a $CO_2$ liquefaction heat exchanger for CCUS (Carbon Capture, Utilization, and Storage); and
   d. the ice slurry storage tank is sized for a capacity sufficiently large enough for the continuous operation by storing the excess ice slurry and discharging it during the hours for the deficient amount to users.

7. The LNG cold energy recovery system of claim 6, wherein:
   a. the $CO_2$ liquefaction heat exchanger condenses $CO_2$ gas by using the ice slurry generated with the LNG cold energy recovered;
   b. said $CO_2$ gas 482 is fed from $CO_2$ capture processes;
   c. said ice slurry is available for $CO_2$ liquefaction from −45° C.;
   d. said $CO_2$ gas is liquefied at −30° C. and 15 bar for transport;
   e. said ice slurry is supplied at temperatures higher than −45° C. in order to condense $CO_2$ gas at higher pressures;
   f. said $CO_2$ gas is liquefied for temporary storage for CCUS (Carbon Capture, Utilization, and Storage); and
   g. said recovered LNG cold energy is used to cool the $CO_2$ gas during the compression process for CCUS.

8. The LNG cold energy recovery system of claim 1, wherein:
   a. the ice slurry is generated at the ice concentration up to 15% in weight;
   b. said ice slurry can be concentrated for various applications; and
   c. for the ice slurry, ice particles of 1 mm to 100 micron in diameter are used.

9. The LNG cold energy recovery system of claim 1, wherein said LNG regasification heat exchanger is a closed system having an LNG side and a toluene side, wherein for the LNG side, stainless steel is used for the material of construction and for the toluene side, the material of construction is a substance selected from a group consisting stainless steel and carbon steel.

10. The LNG cold energy recovery system of claim 4, wherein said superheater heat exchanger is a closed system having a natural gas side and a heating medium side, wherein for the natural gas side, stainless steel is used for construction and for the heating medium side, the material of construction is a substance selected from a group consisting stainless steel and carbon steel.

11. The LNG cold energy recovery system of claim 5, wherein the ice slurry separation tank further comprises a pump to circulate the toluene stream from a top layer of the ice slurry separation tank to the LNG regasification heat exchanger and then to the bottom layer of the ice slurry production tank.

12. The LNG cold energy recovery system of claim 4, wherein:
   a. the natural gas superheater heat exchanger is used to heat the natural gas exiting the LNG regasification heat exchanger;
   b. a $CO_2$ stream for a CCUS heats the natural gas as a heating medium; and
   c. said $CO_2$ stream is condensed in a $CO_2$ liquefaction heat exchanger.

13. The LNG cold energy recovery system of claim 1, wherein no nitrogen gas is entrained in the toluene stream fed to the LNG regasification heat exchanger.

14. The LNG cold energy recovery system of claim 1, wherein no ice slurry is entrained in the toluene stream fed to the LNG regasification heat exchanger.

15. The LNG cold energy recovery system of claim 1, wherein nitrogen blanketing is used for the ice slurry production tank to prevent leakage of the bottom layer of heavy solvent.

16. The LNG cold energy recovery system of claim 5, wherein each of the ice slurry production tank and the ice slurry separation tank has a safety valve leading to a flare system.

17. The LNG cold energy recovery system of claim 6, wherein:
   a. the LNG cold energy is used for cooling data centers operating at 18° C. to 27° C. with an air cooling system;
   b. for cooling data centers, the ice slurry storage tanks operate at −20° C.;
   c. the ice slurry is heat exchanged with a heat transfer fluid (HTF) for a data center operating temperature of 18° C. to 27° C. with a temperature approach of 5° C. to 10° C.;
   d. the HTF dissolves a freezing point depressant selected from a group composing LiCl, NaCl, $K_2CO_3$, $CaCl_2$, $MgCl_2$, ethylene glycol, propyleneglycol, KAc (potassium acetate) and KCOOH (potassium formate);
   e. the HTF is heat exchanged with air for the air cooling system; and
   f. cold air is blown to cool servers.

18. A LNG cold energy recovery system comprising:
a. an LNG regasification heat exchanger, the LNG regasification heat exchanger receiving LNG at −162° C. and vaporizing the LNG to natural gas;
b. an ice slurry production tank having a top layer having a light solvent, a middle layer having water and a bottom layer having a heavy solvent; wherein the middle layer comprises water, ice particles and a freezing point depressant, wherein the top, middle and bottom layers are different liquids with different densities and immiscible to each other, and wherein toluene is chilled by the LNG regasification heat exchanger and fed into the bottom layer, thereby forming toluene bubbles having less density than the middle layer;
c. a superheater heat exchanger, wherein the natural gas from said LNG regasification heat exchanger is heated to a temperature above +2° C. in the natural gas superheater heat exchanger; wherein the heating medium for said superheater heat exchanger is an aqueous solution of a freezing point depressant which can be cooled to a temperature below 0° C. at an exit of the superheater heat exchanger, and where in the freezing point depressant is a substance selected from a group consisting LiCl, NaCl, ethylene glycol, propylene glycol, KAc (potassium acetate) and potassium formate (KCOOH);
d. an ice slurry separation tank for separating an ice slurry stream from a toluene stream from the ice slurry production tank; wherein the terminal velocity of a toluene bubble of 5 mm in diameter is Vt m/s whereas the hindered settling velocity of an ice particle of 1 mm in diameter Vs m/s, wherein, for the downward ice slurry flow at a bottom section of the ice slurry separation tank, the bulk flow velocity is maintained higher than Vs m/s but lower than Vt m/s, and wherein, for the upward toluene flow exiting through a nozzle located at the top section of the ice slurry separation tank, the nozzle is located where the level of the nozzle can prevent entrainment of blanketing nitrogen gas and the ice slurry;
e. an ice slurry storage tank for receiving ice slurry from the ice slurry separation tank; where in the ice slurry storage tank operates continuously for LNG cold energy recovery while charging and discharging ice slurry at the same time, wherein the ice slurry storage tank is charged with ice slurry from the ice slurry separation tank, wherein the ice slurry storage tank discharges ice slurry at least to cold energy users, and wherein the ice slurry storage tank is sized for a capacity sufficiently large enough for the continuous operation by storing the excess ice slurry and discharging it during the hours for the deficient amount to users; and
f. a $CO_2$ liquefaction heat exchanger, the ice slurry from the ice slurry storage tank discharged to the $CO_2$ liquefaction heat exchanger for CCUS (Carbon Capture, Utilization, and Storage); wherein the $CO_2$ liquefaction heat exchanger condenses $CO_2$ gas by using the ice slurry generated with the LNG cold energy recovered, said $CO_2$ gas 482 is fed from $CO_2$ capture processes, said ice slurry is available for $CO_2$ liquefaction from −45° C., said $CO_2$ gas is liquefied at −30° C. and 15 bar for transport, said ice slurry is supplied at temperatures higher than −45° C. in order to condense $CO_2$ gas at higher pressures, said $CO_2$ gas is liquefied for temporary storage for CCUS, and said recovered LNG cold energy is used to cool the $CO_2$ gas during the compression process for CCUS.

19. The LNG cold energy recovery system of claim 18, wherein the bottom heavy solvent layer is selected from a group consisting perfluorohexane ($C_6F_{14}$) and perfluoroheptane ($C_7F_{16}$).

20. The LNG cold energy recovery system of claim 18, wherein the freezing point depressant dissolves in water and is insoluble in the top light solvent and in said heavy solvent; wherein the freezing point depressant is a substance selected from a group comprising LiCl, NaCl, $K_2CO_3$, $CaCl_2$), $MgCl_2$, KAc (Potassium Acetate), and KCOOH (Potassium Formate).

* * * * *